United States Patent
Hsu et al.

(10) Patent No.: US 10,527,821 B2
(45) Date of Patent: Jan. 7, 2020

(54) IMAGING OPTICAL LENS ASSEMBLY, IMAGE CAPTURING UNIT AND ELECTRONIC DEVICE

(71) Applicant: LARGAN Precision Co., Ltd., Taichung (TW)

(72) Inventors: Po-Lun Hsu, Taichung (TW); Wei-Yu Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 111 days.

(21) Appl. No.: 15/834,947

(22) Filed: Dec. 7, 2017

(65) Prior Publication Data
US 2018/0095252 A1    Apr. 5, 2018

Related U.S. Application Data

(63) Continuation of application No. 15/046,309, filed on Feb. 17, 2016, now Pat. No. 9,880,373.

(30) Foreign Application Priority Data

Jan. 13, 2016  (TW) .............................. 105101005 A

(51) Int. Cl.
| | |
|---|---|
| *G02B 13/00* | (2006.01) |
| *G02B 27/00* | (2006.01) |
| *G02B 9/60* | (2006.01) |

(52) U.S. Cl.
CPC ..... *G02B 13/0045* (2013.01); *G02B 27/0025* (2013.01); *G02B 9/60* (2013.01)

(58) Field of Classification Search
CPC ...... G02B 9/60; G02B 13/0045; G02B 13/18; G02B 3/04
See application file for complete search history.

(56) References Cited

U.S. PATENT DOCUMENTS

| | | |
|---|---|---|
| 4,733,953 A | 3/1988 | Yamamoto et al. |
| 4,993,817 A | 2/1991 | Hoogland |
| (Continued) | | |

FOREIGN PATENT DOCUMENTS

| | | |
|---|---|---|
| CN | 105467563 A | 4/2016 |
| JP | 2009294528 A | 12/2009 |
| (Continued) | | |

OTHER PUBLICATIONS

United States Patent and Trademark Office, "Notice of Allowance," issued in connection with U.S. Appl. No. 15/046,309, dated Sep. 20, 2017, 34 pages.

*Primary Examiner* — Robert E. Tallman
(74) *Attorney, Agent, or Firm* — Hanley, Flight & Zimmerman, LLC

(57) ABSTRACT

An imaging optical lens assembly includes, in order from an object side to an image side, a first lens element, a second lens element, a third lens element, a fourth lens element and a fifth lens element. The first lens element with positive refractive power has an object-side surface being convex in a paraxial region. The second lens element with negative refractive power has an object-side surface being concave in a paraxial region. The third lens element has an object-side surface and an image-side surface being aspheric. The fourth lens element with negative refractive power has an object-side surface being concave and an image-side surface being concave in a paraxial region, wherein the image-side surface has convex shape in an off-axis region, and the two surfaces thereof are aspheric. The fifth lens element with positive refractive power has an object-side surface and an image-side surface being both aspheric.

26 Claims, 19 Drawing Sheets

(56) References Cited

U.S. PATENT DOCUMENTS

| | | |
|---|---|---|
| 8,325,430 B1 | 12/2012 | Tsai |
| 8,760,775 B2 | 6/2014 | Shinohara |
| 2014/0098428 A1 | 4/2014 | Shinohara |
| 2014/0198396 A1 | 7/2014 | Hsu et al. |
| 2014/0204480 A1 | 7/2014 | Jo et al. |
| 2014/0300975 A1 | 10/2014 | Tsai et al. |
| 2015/0103225 A1* | 4/2015 | Hsu .................. G02B 13/0045 348/335 |
| 2015/0116569 A1 | 4/2015 | Mercado |
| 2015/0168695 A1* | 6/2015 | Tsai .................. G02B 13/0045 348/360 |
| 2015/0253647 A1 | 9/2015 | Mercado |
| 2017/0192207 A1 | 7/2017 | Chen et al. |

FOREIGN PATENT DOCUMENTS

| | | | |
|---|---|---|---|
| TW | 201403121 A | * | 1/2014 |
| TW | 201415075 A | * | 4/2014 |
| WO | 2017023086 A1 | | 2/2017 |
| WO | 2017034307 A1 | | 3/2017 |

* cited by examiner

IMAGING OPTICAL LENS ASSEMBLY, IMAGE CAPTURING UNIT AND ELECTRONIC DEVICE

RELATED APPLICATIONS

This application is a continuation patent application of U.S. application Ser. No. 15/046,309, filed on Feb. 17, 2016, which claims priority under 35 U.S.C. § 119 to Taiwan Application 105101005, filed Jan. 13, 2016, each of which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

Conventional telephoto optical systems have been employed in portable electronic products for satisfying the various requirements such as high resolution and superior image quality. However, the conventional optical system design has a long track length and small aperture with lower image quality and a large size. Therefore, it is undesirable for compact electronic devices with high-end specifications. Thus, there is a need to develop an optical system featuring a telephoto design with high image quality.

SUMMARY

According to one aspect of the present disclosure, an imaging optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an object-side surface being concave in a paraxial region thereof. The third lens element has an object-side surface and an image-side surface being both aspheric. The fourth lens element with negative refractive power has an object-side surface being concave in a paraxial region thereof and an image-side surface being concave in a paraxial region thereof, wherein the image-side surface of the fourth lens element has at least one convex shape in an off-axis region thereof, and the object-side surface and the image-side surface of the fourth lens element are both aspheric. The fifth lens element with positive refractive power has an object-side surface and an image-side surface being both aspheric. The imaging optical lens assembly has a total of five lens elements, and there is an air gap in a paraxial region between every two of the lens elements that are adjacent to each other. When a focal length of the imaging optical lens assembly is f, a curvature radius of the object-side surface of the second lens element is R3, a curvature radius of an image-side surface of the second lens element is R4, a curvature radius of the image-side surface of the fifth lens element is R10, the following conditions are satisfied:

$(R3+R4)/(R3-R4)<0.50$; and $f/|R10|<1.20$.

According to another aspect of the present disclosure, an imaging optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an object-side surface being concave in a paraxial region thereof. The third lens element has an object-side surface and an image-side surface being both aspheric. The fourth lens element with negative refractive power has an object-side surface being concave in a paraxial region thereof and an image-side surface being concave in a paraxial region thereof, wherein the image-side surface of the fourth lens element has at least one convex shape in an off-axis region thereof, and the object-side surface and the image-side surface of the fourth lens element are both aspheric. The fifth lens element with positive refractive power has an object-side surface and an image-side surface being both aspheric. The imaging optical lens assembly has a total of five lens elements, and there is an air gap in a paraxial region between every two of the lens elements that are adjacent to each other. When a focal length of the imaging optical lens assembly is f, a curvature radius of the object-side surface of the second lens element is R3, a curvature radius of an image-side surface of the second lens element is R4, a maximum image height of the imaging optical lens assembly is ImgH, the following conditions are satisfied:

$(R3+R4)/(R3-R4)<0.50$; and $0.25<ImgH/f<0.55$.

According to still another aspect of the present disclosure, an image capturing unit includes one or more of the aforementioned imaging optical lens assemblies and an image sensor, wherein the image sensor is disposed on an image surface of the imaging optical lens assembly.

According to yet still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
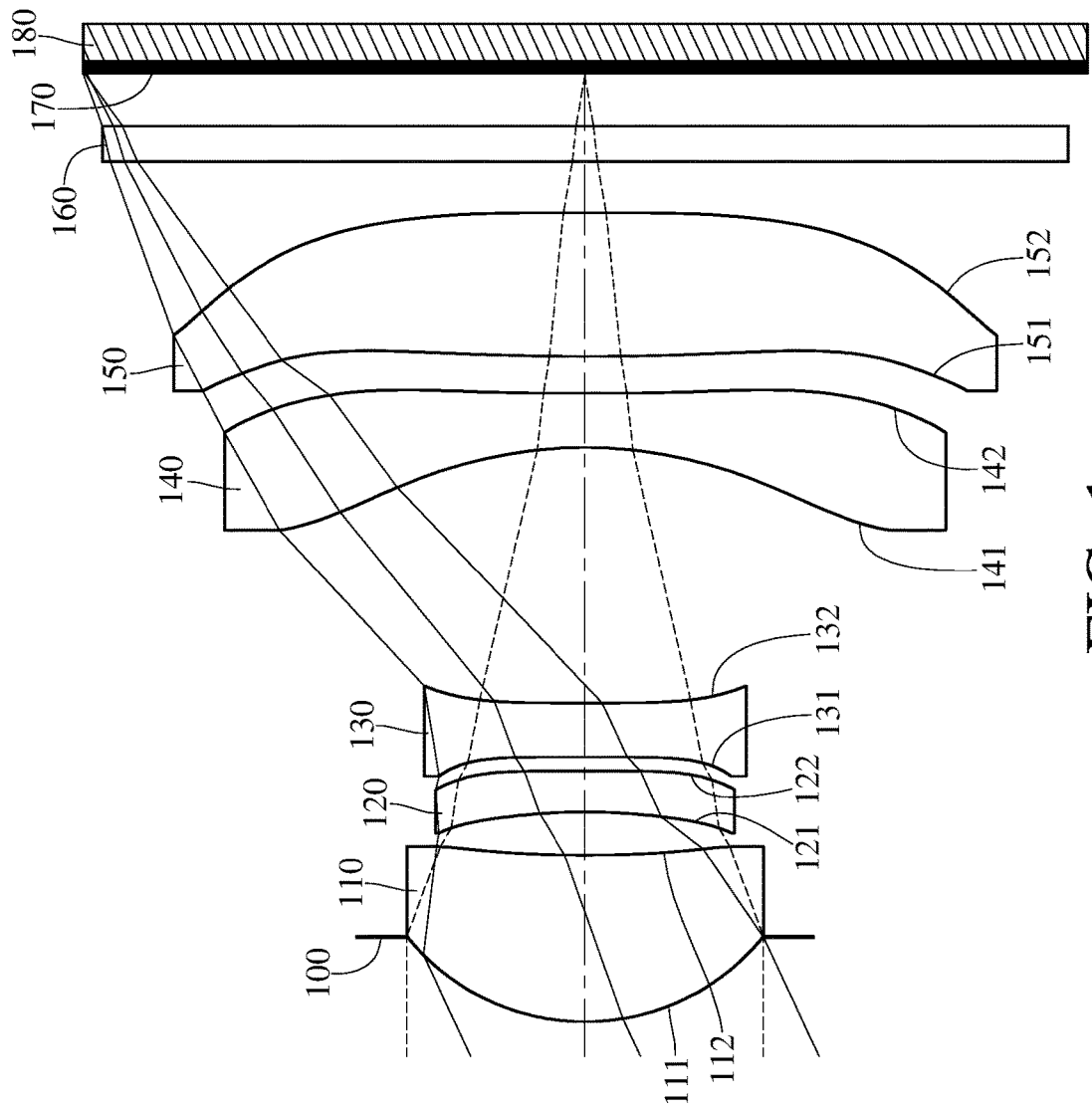
FIG. 1 is a schematic view of an image capturing unit according to the 1st embodiment of the present disclosure.

An imaging optical lens assembly includes, in order from an object side to an image side, a first lens element, a second lens element, a third lens element, a fourth lens element and a fifth lens element. The imaging optical lens assembly has a total of five lens elements.

There is an air gap in a paraxial region between every two lens elements of the imaging optical lens assembly that are adjacent to each other; that is, each of the first through fifth lens elements can be a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there is an air gap in a paraxial region between every two lens elements of the photographing optical lens assembly that are adjacent to each other in the present disclosure for solving the problem generated by the cemented lens elements.

The first lens element with positive refractive power has an object-side surface being convex in a paraxial region thereof. Therefore, it is favorable for providing the positive refractive power needed for the imaging optical lens assembly and reducing a total track length.

The second lens element with negative refractive power has an object-side surface being concave in a paraxial region thereof. Therefore, it is favorable for correcting aberrations generated by the first lens element.

The third lens element has an object-side surface and an image-side surface, wherein each of the object-side surface and the image-side surface of the third lens element can have at least one concave shape in an off-axis region thereof. Therefore, it is favorable for reducing the incident angle of the light projecting onto an image sensor so as to improve the image-sensing efficiency of the image sensor, thereby correcting the aberration of the off-axis field.

The fourth lens element with negative refractive power has an object-side surface being concave in a paraxial region thereof and an image-side surface being concave in a paraxial region thereof. Therefore, it is favorable for reducing a back focal length. Furthermore, the image-side surface of the fourth lens element has at least one convex shape in an off-axis region thereof so that it is favorable for reducing a chief ray angle at the peripheral region of the image, and thereby the image sensor is capable of capturing images at high resolution.

The fifth lens element with positive refractive power can have an object-side surface and an image-side surface both being convex in a paraxial region thereof. Therefore, it is favorable for correcting aberrations generated from overly strong refractive power of the first through the fourth lens elements.

When a curvature radius of the object-side surface of the second lens element is R3, a curvature radius of an image-side surface of the second lens element is R4, the following condition is satisfied: $(R3+R4)/(R3-R4)<0.50$. Therefore, it is favorable for preventing the surfaces of the second lens element from overly curved at the off-axis region for eliminating the stray light. Preferably, the following condition can also be satisfied: $(R3+R4)/(R3-R4)<0$. Furthermore, the following condition can also be satisfied: $-2.5<(R3+R4)/(R3-R4)<0$.

When a focal length of the imaging optical lens assembly is f, a curvature radius of the image-side surface of the fifth lens element is R10, the following condition can be satisfied: $f/|R10|<1.20$. Therefore, it is favorable for obtaining a desirable back focal length by preventing the shape of the fifth lens element being overly curved. In detail, when the image-side surface of the fifth lens element is convex in the paraxial region thereof, it is favorable for preventing the back focal length from too long; when the image-side surface of the fifth lens element is concave in the paraxial region thereof, it is favorable for preventing the back focal length from too short. By satisfying the condition, it is favorable for keeping the imaging optical lens assembly compact with a proper back focal length. Preferably, the following condition can also be satisfied: $f/|R10|<0.75$.

When the focal length of the imaging optical lens assembly is f, a maximum image height of the imaging optical lens assembly (half of a diagonal length of an effective photosensitive area of the image sensor) is ImgH, the following condition can be satisfied: $0.25<ImgH/f<0.55$. Therefore, it is favorable for enhancing the telephoto characteristic of the imaging optical lens assembly.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, the following condition can be satisfied: $1.0<T34/(T12+T23+T45)<4.0$.

Therefore, it is favorable for properly arranging the axial distance between every two adjacent lens elements so as to reduce the sensitivity of the imaging optical lens assembly while obtaining the telephoto characteristic simultaneously.

When a focal length of the second lens element is f2, a focal length of the fourth lens element is f4, and the following condition can be satisfied: f4/f2<1.0. Therefore, it is favorable for balancing the refractive power of the second lens element and the fourth lens element so as to prevent the surfaces of the second lens element from overly curved.

When an Abbe number of the first lens element is V1, an Abbe number of the second lens element is V2, an Abbe number of the third lens element is V3, an Abbe number of the fourth lens element is V4, an Abbe number of the fifth lens element is V5, the following condition can be satisfied: 0.45<(V2+V3+V5)/(V1+V4)<0.75. Therefore, it is favorable for balancing between corrections of chromatic aberration and astigmatism.

When the axial distance between the third lens element and the fourth lens element is T34, an axial distance between the image-side surface of the fifth lens element and an image surface is BL, the following condition can be satisfied: 1.20<T34/BL<2.5. Therefore, it is favorable for obtaining a proper chief ray angle so as to further improve the image-sensing efficiency of the image sensor.

When a curvature radius of the object-side surface of the fourth lens element is R7, a curvature radius of the image-side surface of the fourth lens element is R8, the following condition can be satisfied: −1.0<R7/R8<0. Therefore, it is favorable for further reducing the back focal length.

When an axial distance between the object-side surface of the first lens element and the image surface is TL, the focal length of the imaging optical lens assembly is f, the following condition can be satisfied: 0.75<TL/f<1.10. Therefore, it is favorable for reducing the total track length while obtaining the telephoto characteristic.

When the focal length of the imaging optical lens assembly is f, the focal length of the second lens element is f2, a focal length of the third lens element is f3, the focal length of the fourth lens element is f4, the following condition can be satisfied: −4.0<(f/f2)+(f/f3)+(f/f4)<−2.0. Therefore, it is favorable for correcting the field curvature generated by the first lens element.

When the axial distance between the first lens element and the second lens element is T12, the axial distance between the second lens element and the third lens element is T23, the following condition can be satisfied: 0<T23/T12<1.75. Therefore, it is favorable for preventing the axial distance between the first lens element and the second lens element from overly short so as to provide an easier lens assembling process, thereby increasing the assembling yield rate.

When the Abbe number of the fourth lens element is V4, the Abbe number of the fifth lens element is V5, the following condition can be satisfied: 1.8<V4/V5<3.5. Therefore, it is favorable for correcting chromatic aberration.

When the focal length of the imaging optical lens assembly is f, the focal length of the third lens element is f3, the following condition can be satisfied: −1.2<f/f3≤0. Therefore, it is favorable for enhancing the aberration correction capability so as to improve the image quality.

According to the present disclosure, an aperture stop can be disposed as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the imaging optical lens assembly can be made of glass or plastic material. When the lens elements are made of glass material, the refractive power distribution of the imaging optical lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the imaging optical lens assembly can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the imaging optical lens assembly on the corresponding image sensor can be flat or curved, particularly a concave curved surface facing towards the object side of the imaging optical lens assembly.

According to the present disclosure, the imaging optical lens assembly can include at least one stop, such as an aperture stop, a glare stop or a field stop. Said glare stop or said field stop is allocated for eliminating the stray light and thereby improving the image quality thereof.

According to the present disclosure, an image capturing unit includes the aforementioned imaging optical lens assembly and an image sensor, wherein the image sensor is disposed on the image side and can be located on or near an image surface of the aforementioned imaging optical lens assembly. In some embodiments, the image capturing unit can further include a barrel member, a holding member or a combination thereof.

Figure 17:
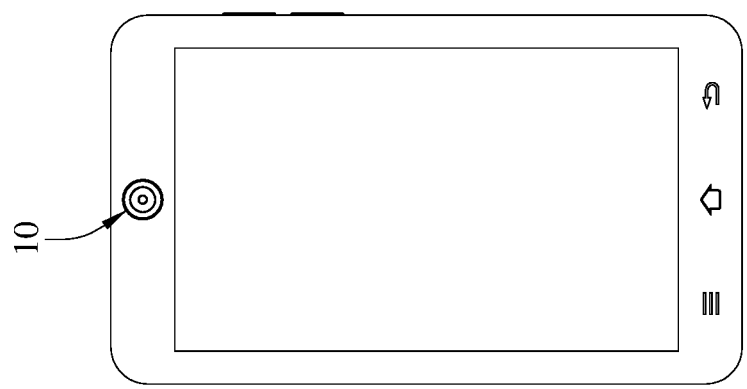
FIG. 17 shows an electronic device according to one embodiment.
Figure 18:
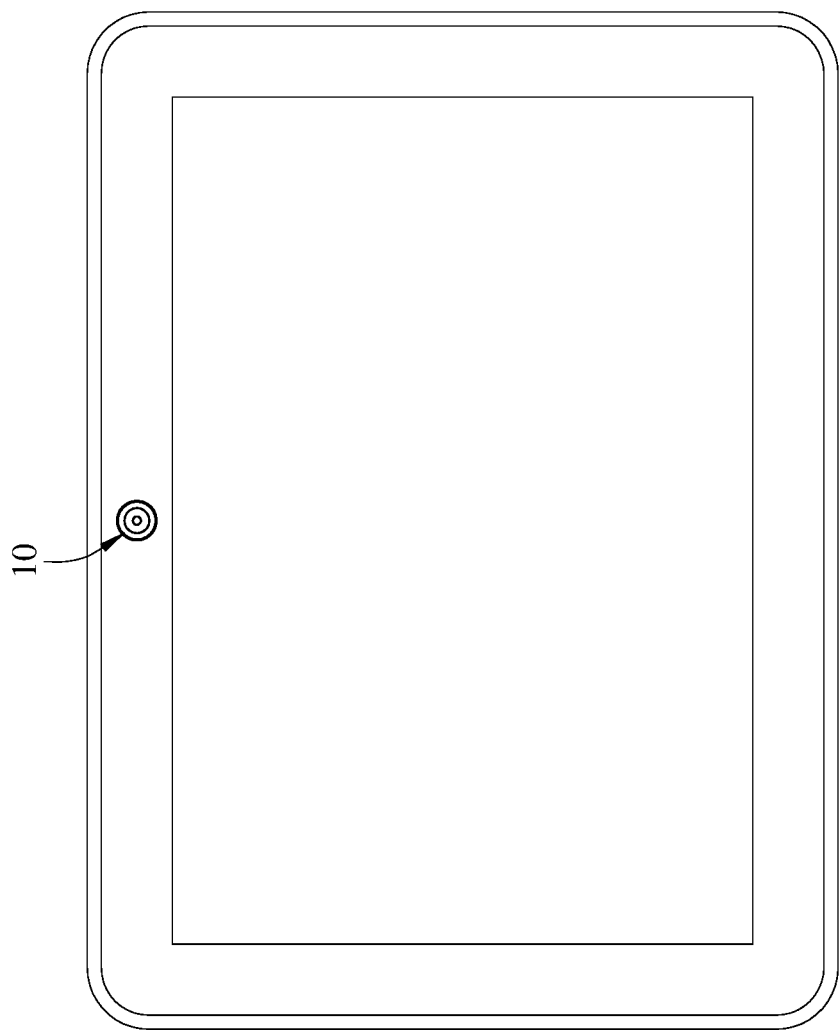
FIG. 18 shows an electronic device according to another embodiment.
Figure 19:
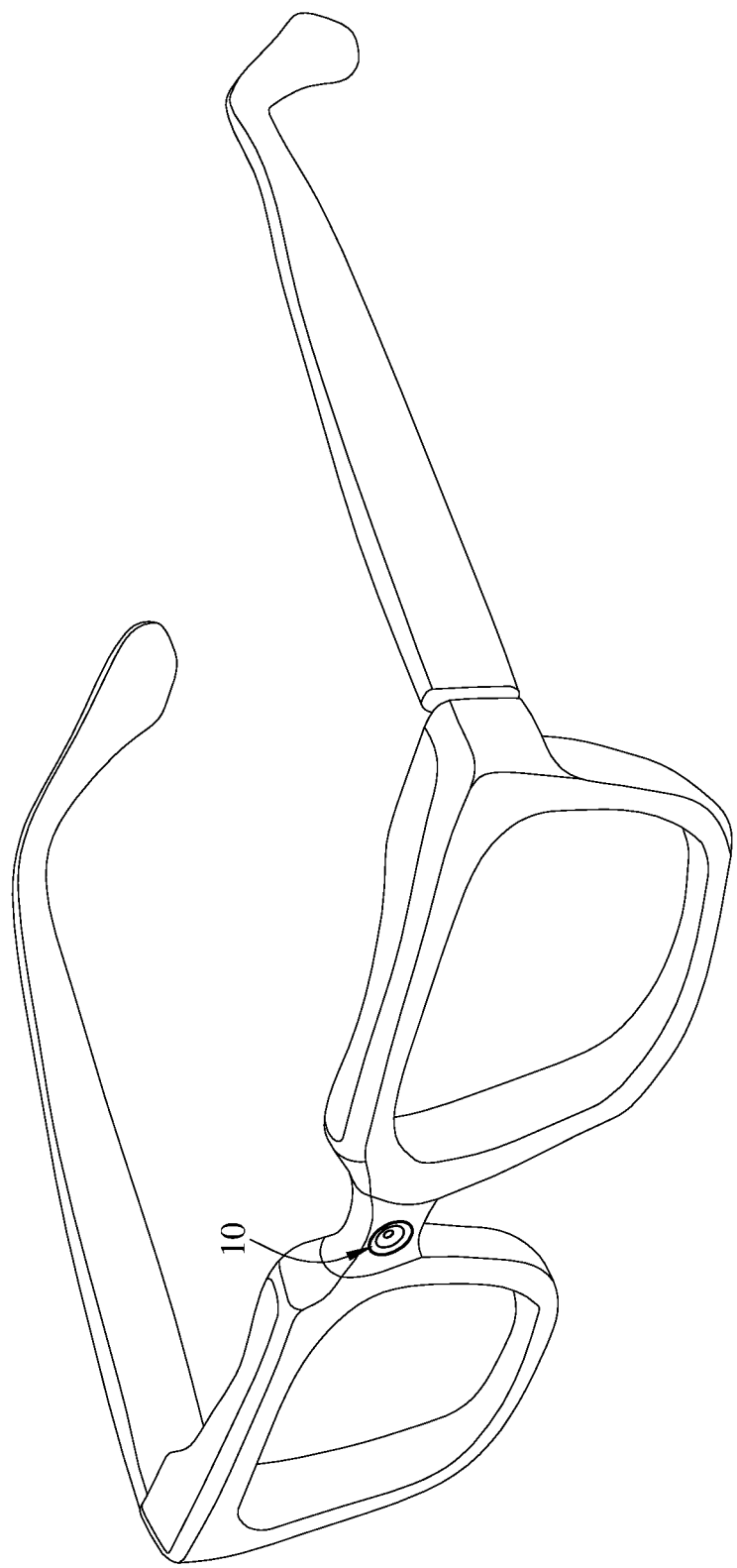
FIG. 19 shows an electronic device according to still another embodiment.

In FIG. 17, FIG. 18, and FIG. 19, an image capturing unit 10 may be installed in, but not limited to, an electronic device, including a smart phone (FIG. 17), a tablet personal computer (FIG. 18) or a wearable device (FIG. 19). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the imaging optical lens assembly can be optionally applied to optical systems with a movable focus. Furthermore, the imaging optical lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
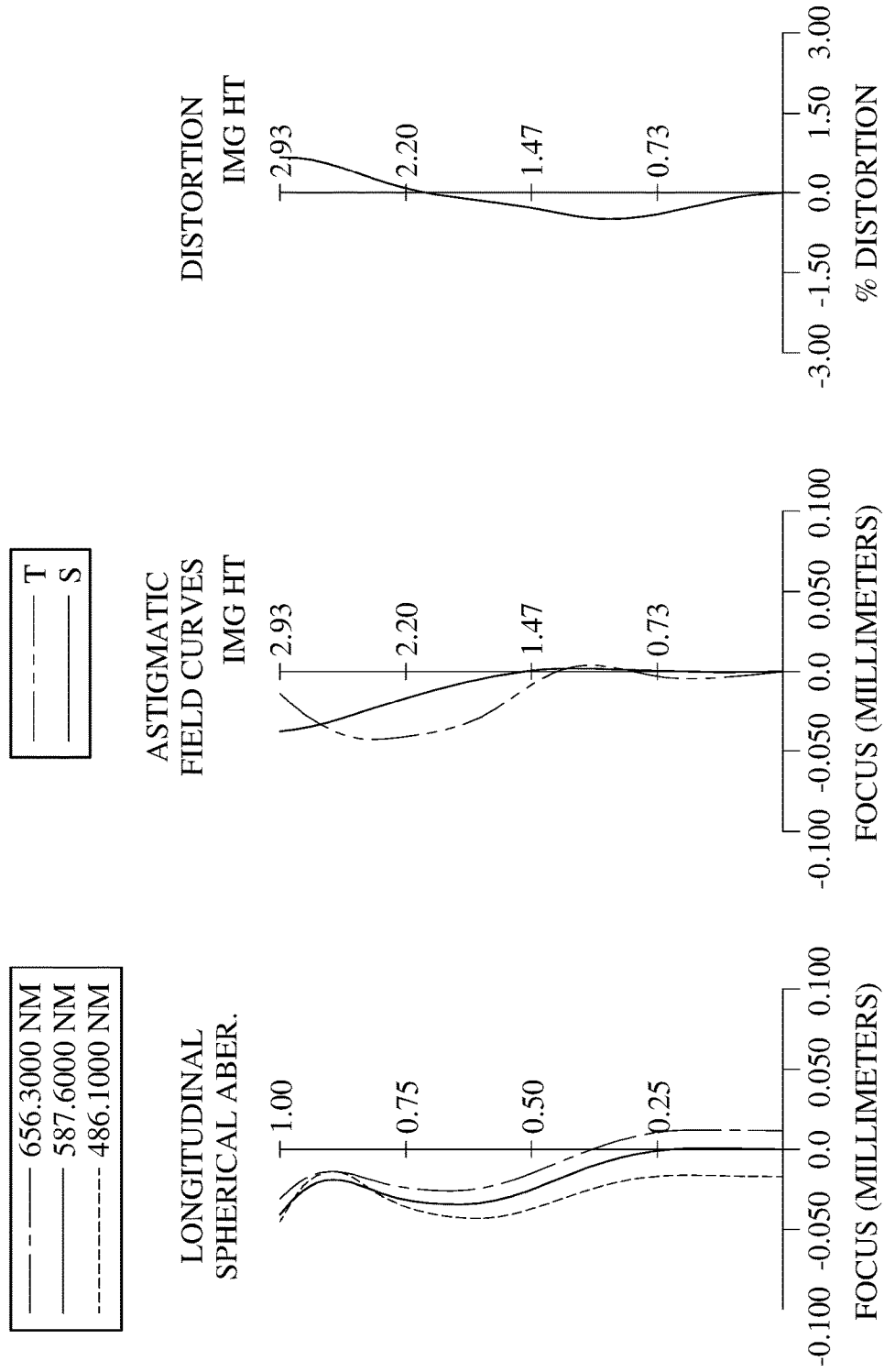
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 180. The imaging optical lens assembly includes, in order from an object side to an image side, an aperture stop 100, a first lens element 110, a second lens element 120, a third lens element 130, a fourth lens element 140, a fifth lens element 150, an IR-cut filter 160 and an image surface 170, wherein the imaging optical lens assembly has a total of five lens elements (110-150). There is an air gap in a paraxial region between every two of the first lens element 110, the second lens element 120, the third lens element 130, the fourth lens element 140 and the fifth lens element 150 that are adjacent to each other.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 has an object-side surface 131 being planar in a paraxial region thereof and an image-side surface 132 being planar in a paraxial region thereof. The third lens element 130 is made of plastic material and has the object-side surface 131 and the image-side surface 132 being both aspheric. The object-side surface 131 has at least one concave shape in an off-axis region thereof. The image-side surface 132 has at least one concave shape in an off-axis region thereof.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. The image-side surface 142 of the fourth lens element 140 has at least one convex shape in an off-axis region thereof.

The fifth lens element 150 with positive refractive power has an object-side surface 151 being convex in a paraxial region thereof and an image-side surface 152 being planar in a paraxial region thereof. The fifth lens element 150 is made of plastic material and has the object-side surface 151 and the image-side surface 152 being both aspheric.

The IR-cut filter 160 is made of glass material and located between the fifth lens element 150 and the image surface 170, and will not affect the focal length of the imaging optical lens assembly. The image sensor 180 is disposed on or near the image surface 170 of the imaging optical lens assembly.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma_i(Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens assembly of the image capturing unit according to the 1st embodiment, when a focal length of the imaging optical lens assembly is f, an f-number of the imaging optical lens assembly is Fno, and half of a maximal field of view of the imaging optical lens assembly is HFOV, these parameters have the following values: f=6.29 millimeters (mm), Fno=3.00; and HFOV=24.9 degrees (deg.).

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, the following condition is satisfied: (V2+V3+V5)/(V1+V4)=0.54.

When the Abbe number of the fourth lens element 140 is V4, the Abbe number of the fifth lens element 150 is V5, the following condition is satisfied: V4/V5=2.75.

When an axial distance between the first lens element 110 and the second lens element 120 is T12, an axial distance between the second lens element 120 and the third lens element 130 is T23, the following condition is satisfied: T23/T12=0.32.

When the axial distance between the first lens element 110 and the second lens element 120 is T12, the axial distance between the second lens element 120 and the third lens element 130 is T23, an axial distance between the third lens element 130 and the fourth lens element 140 is T34, an axial distance between the fourth lens element 140 and the fifth lens element 150 is T45, the following condition is satisfied: T34/(T12+T23+T45)=2.73.

When the axial distance between the third lens element 130 and the fourth lens element 140 is T34, an axial distance between the image-side surface 152 of the fifth lens element 150 and the image surface 170 is BL, the following condition is satisfied: T34/BL=1.84.

When an axial distance between the object-side surface 111 of the first lens element 110 and the image surface 170 is TL, the focal length of the imaging optical lens assembly is f, the following condition is satisfied: TL/f=0.89.

When a maximum image height of the imaging optical lens assembly is ImgH, the focal length of the imaging optical lens assembly is f, the following condition is satisfied: ImgH/f=0.47.

When a curvature radius of the object-side surface 121 of the second lens element 120 is R3, a curvature radius of the image-side surface 122 of the second lens element 120 is R4, the following condition is satisfied: (R3+R4)/(R3−R4)=−1.15.

When a curvature radius of the object-side surface 141 of the fourth lens element 140 is R7, a curvature radius of the image-side surface 142 of the fourth lens element 140 is R8, the following condition is satisfied: R7/R8=−0.06.

When the focal length of the imaging optical lens assembly is f, a curvature radius of the image-side surface 152 of the fifth lens element 150 is R10, the following condition is satisfied: f/|R10|=0.

When the focal length of the imaging optical lens assembly is f, a focal length of the second lens element 120 is f2, a focal length of the third lens element 130 is f3, a focal length of the fourth lens element 140 is f4, the following condition is satisfied: (f/f2)+(f/f3)+(f/f4)=−2.55.

When the focal length of the imaging optical lens assembly is f, the focal length of the third lens element 130 is f3, the following condition is satisfied: f/f3=0.

When the focal length of the second lens element 120 is f2, the focal length of the fourth lens element 140 is f4, the following condition is satisfied: f4/f2=0.80.

The detailed optical data of the 1st embodiment are shown in Table 1 and the aspheric surface data are shown in Table 2 below.

TABLE 1

1st Embodiment
f = 6.29 mm, Fno = 3.00, HFOV = 24.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.498 | | | | |
| 2 | Lens 1 | 1.360 | (ASP) | 0.983 | Plastic | 1.515 | 56.5 | 3.02 |
| 3 | | 8.299 | (ASP) | 0.255 | | | | |
| 4 | Lens 2 | −3.382 | (ASP) | 0.240 | Plastic | 1.660 | 20.4 | −5.53 |
| 5 | | −47.602 | (ASP) | 0.081 | | | | |
| 6 | Lens 3 | ∞ | (ASP) | 0.320 | Plastic | 1.660 | 20.4 | ∞ |
| 7 | | ∞ | (ASP) | 1.505 | | | | |
| 8 | Lens 4 | −2.567 | (ASP) | 0.320 | Plastic | 1.544 | 56.0 | −4.45 |
| 9 | | 45.176 | (ASP) | 0.216 | | | | |
| 10 | Lens 5 | 15.059 | (ASP) | 0.849 | Plastic | 1.660 | 20.4 | 22.82 |
| 11 | | ∞ | (ASP) | 0.300 | | | | |
| 12 | IR-cut filter | Plano | | 0.210 | Glass | 1.517 | 64.2 | — |
| 13 | | Plano | | 0.309 | | | | |
| 14 | Image | Plano | | — | | | | |

Note:
Reference wavelength is 587.6 nm (d-line).
An effective radius of the image-side surface of the second lens element (Surface 5) is 0.880 mm.

TABLE 2

Aspheric Coefficients

| Surface # | 2 | 3 | 4 | 5 | 6 |
|---|---|---|---|---|---|
| k = | −1.2001E+00 | −4.7039E+01 | −1.7270E+01 | −8.8668E+01 | 0.0000E+00 |
| A4 = | 6.0246E−02 | 4.8948E−02 | 4.9917E−02 | 1.8884E−02 | −3.7609E−02 |
| A6 = | 1.6751E−02 | −1.0033E−02 | −2.5978E−01 | −4.7281E−01 | −4.7122E−02 |
| A8 = | 4.0725E−03 | −2.2803E−02 | 3.8058E−01 | 1.7524E−01 | −1.3504E+00 |
| A10 = | 3.1200E−03 | −3.8013E−02 | −6.7434E−01 | 4.6336E−01 | 3.5253E+00 |
| A12 = | 1.5104E−03 | 1.1314E−02 | 6.7813E−01 | −5.2948E−01 | −3.7789E+00 |
| A14 = | — | — | −2.6045E−01 | 1.6669E−01 | 1.4062E+00 |
| A16 = | — | — | — | — | −1.8085E−09 |

| Surface # | 7 | 8 | 9 | 10 | 11 |
|---|---|---|---|---|---|
| k = | 0.0000E+00 | −9.6890E+00 | −8.9997E+01 | −1.3963E+00 | 0.0000E+00 |
| A4 = | 1.1183E−01 | −3.3992E−02 | 4.4171E−02 | −3.8242E−03 | −4.5634E−02 |
| A6 = | 7.2768E−02 | −2.3472E−02 | −5.8044E−02 | −1.3674E−04 | 1.7063E−02 |
| A8 = | −3.1392E−01 | 2.8505E−02 | 2.9257E−02 | −1.5358E−03 | −5.1959E−03 |
| A10 = | 7.0758E−01 | −1.0816E−02 | −9.1650E−03 | 1.1265E−05 | 8.1941E−04 |
| A12 = | −7.3955E−01 | 2.1598E−03 | 1.7804E−03 | 1.1704E−04 | −8.4222E−05 |
| A14 = | 2.8943E−01 | −2.1961E−04 | −1.9360E−04 | −1.8050E−05 | 7.3868E−06 |
| A16 = | 3.3786E−09 | 8.0030E−06 | 8.8069E−06 | 6.6217E−07 | −3.3790E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 8th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
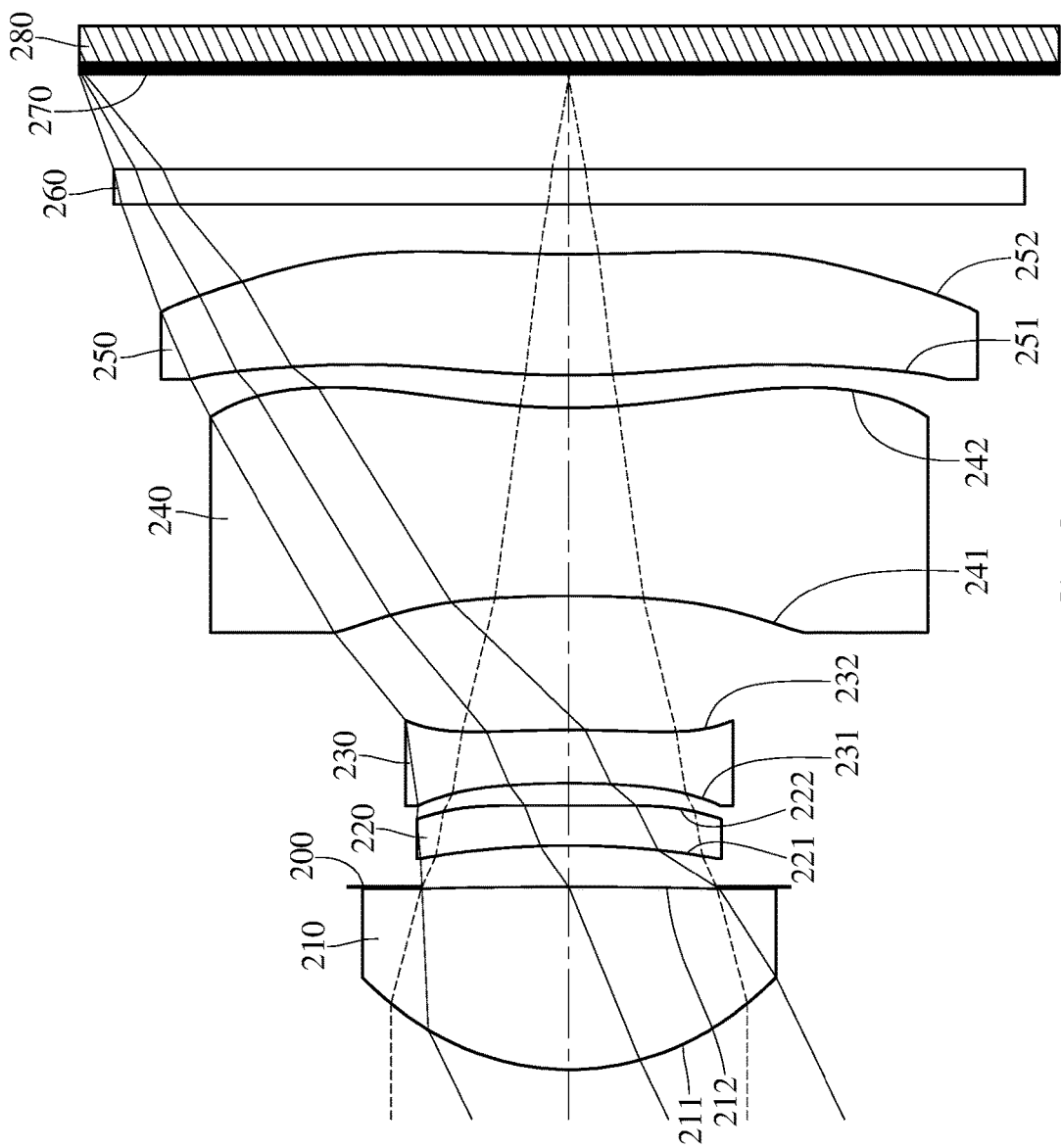
FIG. 3 is a schematic view of an image capturing unit according to the 2nd embodiment of the present disclosure.
Figure 4:
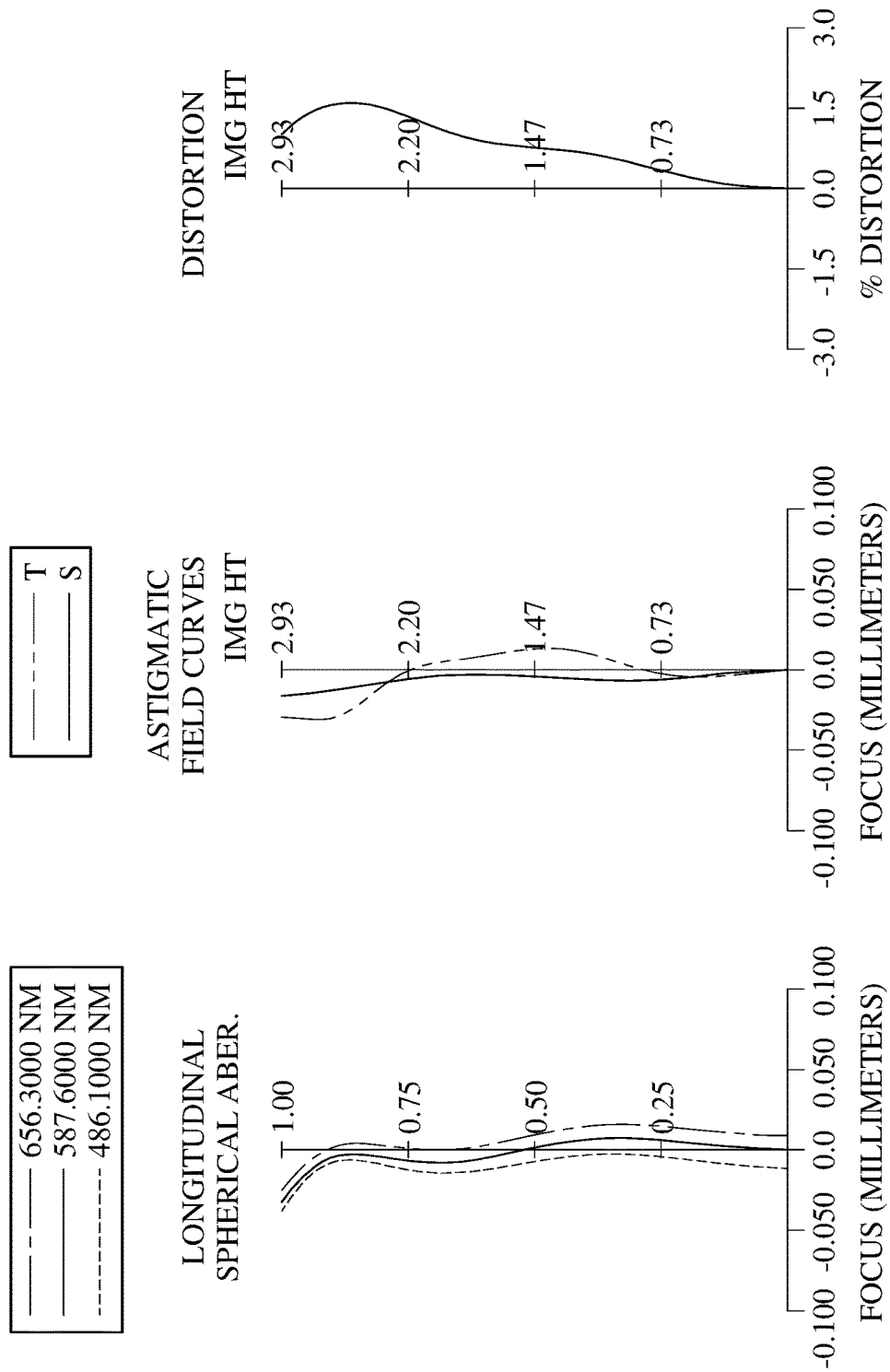
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens assembly (its reference numeral is omitted) of the present disclosure and an image sensor 280. The imaging optical lens assembly includes, in order from an object side to an image side, a first lens element 210, an aperture stop 200, a second lens element 220, a third lens element 230, a fourth lens element 240, a fifth lens element 250, an IR-cut filter 260 and an image surface 270, wherein the imaging optical lens assembly has a total of five lens elements (210-250). There is an air gap in a paraxial region between every two of the first lens element 210, the second lens element 220, the third lens element 230, the fourth lens element 240 and the fifth lens element 250 that are adjacent to each other.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being planar in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has at least one concave shape in an off-axis region thereof. The image-side surface 232 of the third lens element 230 has at least one concave shape in an off-axis region thereof.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one convex shape in an off-axis region thereof.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The IR-cut filter 260 is made of glass material and located between the fifth lens element 250 and the image surface 270, and will not affect the focal length of the imaging optical lens assembly. The image sensor 280 is disposed on or near the image surface 270 of the imaging optical lens assembly.

The detailed optical data of the 2nd embodiment are shown in Table 3 and the aspheric surface data are shown in Table 4 below.

TABLE 3

2nd Embodiment
f = 5.99 mm, Fno = 2.80, HFOV = 25.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.611 | (ASP) | 1.098 | Plastic | 1.515 | 56.5 | 3.01 |
| 2 | | −29.842 | (ASP) | 0.000 | | | | |
| 3 | Ape. Stop | Plano | | 0.253 | | | | |
| 4 | Lens 2 | −4.909 | (ASP) | 0.240 | Plastic | 1.660 | 20.4 | −7.44 |
| 5 | | ∞ | (ASP) | 0.135 | | | | |
| 6 | Lens 3 | −5.406 | (ASP) | 0.320 | Plastic | 1.660 | 20.4 | −26.07 |
| 7 | | −8.069 | (ASP) | 0.806 | | | | |
| 8 | Lens 4 | −8.415 | (ASP) | 1.135 | Plastic | 1.544 | 56.0 | −4.86 |
| 9 | | 4.039 | (ASP) | 0.196 | | | | |
| 10 | Lens 5 | 6.153 | (ASP) | 0.731 | Plastic | 1.660 | 20.4 | 17.62 |
| 11 | | 12.452 | (ASP) | 0.300 | | | | |
| 12 | IR-cut filter | Plano | | 0.210 | Glass | 1.517 | 64.2 | — |
| 13 | | Plano | | 0.573 | | | | |
| 14 | Image | Plano | | — | | | | |

Note:
Reference wavelength is 587.6 nm (d-line).

TABLE 4

Aspheric Coefficients

| Surface # | 1 | 2 | 4 | 5 | 6 |
|---|---|---|---|---|---|
| k = | −1.5987E+00 | 1.0000E+01 | −2.5931E+01 | 0.0000E+00 | 1.8992E−16 |
| A4 = | 4.4978E−02 | 1.9102E−02 | 4.9028E−02 | 2.2939E−02 | −1.7172E−02 |

TABLE 4-continued

| Aspheric Coefficients | | | | | |
|---|---|---|---|---|---|
| A6 = | −2.8449E−04 | −2.9350E−02 | −2.7800E−01 | −4.2737E−01 | 3.9204E−02 |
| A8 = | 4.9676E−03 | 1.2080E−02 | 5.4089E−01 | 2.5999E−01 | −1.3322E+00 |
| A10 = | −3.0291E−03 | −1.1846E−02 | −7.4438E−01 | 3.8712E−01 | 3.5906E+00 |
| A12 = | 2.1836E−04 | 1.1314E−02 | 6.7813E−01 | −5.2948E−01 | −3.7789E+00 |
| A14 = | — | — | −2.6045E−01 | 1.6669E−01 | 1.4062E+00 |
| A16 = | — | — | — | — | 1.8509E−08 |

| Surface # | 7 | 8 | 9 | 10 | 11 |
|---|---|---|---|---|---|
| k = | −1.0000E+00 | 8.3103E−01 | −3.1636E+01 | −1.3963E+00 | 3.0395E−08 |
| A4 = | 8.0921E−02 | −2.9569E−02 | 3.2620E−02 | −1.0473E−02 | −1.7398E−02 |
| A6 = | 4.9947E−02 | −2.1878E−02 | −5.1966E−02 | −2.6951E−02 | −1.5236E−02 |
| A8 = | −2.2926E−01 | 2.3826E−02 | 2.8496E−02 | 1.6894E−02 | 8.3300E−03 |
| A10 = | 7.2112E−01 | −1.2924E−02 | −9.2634E−03 | −4.8098E−03 | −1.9567E−03 |
| A12 = | −7.8578E−01 | 5.0207E−03 | 1.7871E−03 | 7.4907E−04 | 2.6014E−04 |
| A14 = | 2.8943E−01 | −7.7064E−04 | −1.8903E−04 | −6.1182E−05 | −1.9291E−05 |
| A16 = | −5.8601E−07 | 8.0030E−06 | 8.3346E−06 | 1.9543E−06 | 6.0075E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.99 | TL/f | 1.00 |
| Fno | 2.80 | ImgH/f | 0.49 |
| HFOV [deg.] | 25.9 | (R3 + R4)/(R3 − R4) | −1.00 |
| (V2 + V3 + V5)/(V1 + V4) | 0.54 | R7/R8 | −2.08 |
| V4/V5 | 2.75 | f/|R10| | 0.48 |
| T23/T12 | 0.53 | (f/f2) + (f/f3) + (f/f4) | −2.27 |
| T34/(T12 + T23 + T45) | 1.38 | f/f3 | −0.23 |
| T34/BL | 0.74 | f4/f2 | 0.65 |

3rd Embodiment

Figure 5:
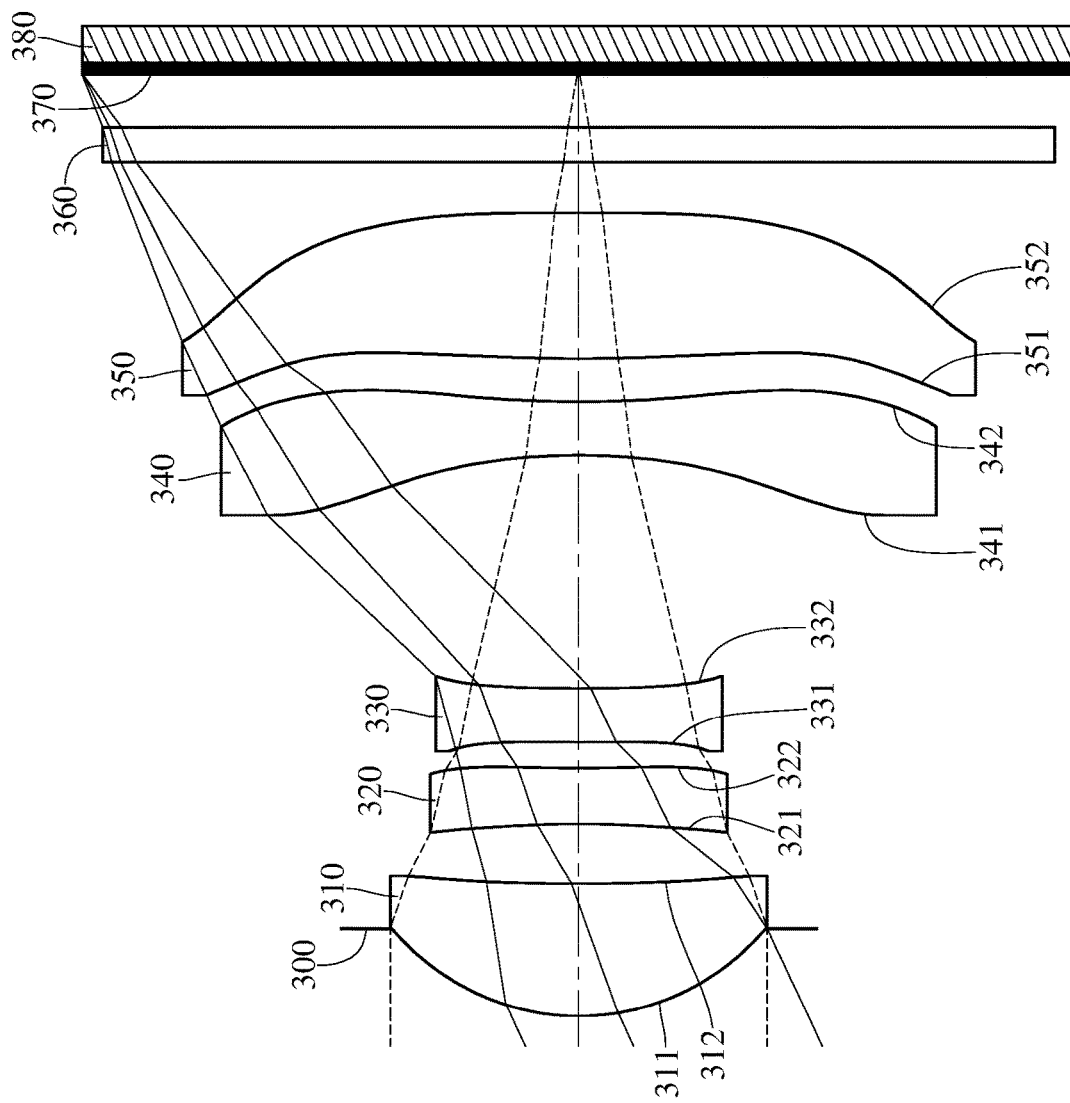
FIG. 5 is a schematic view of an image capturing unit according to the 3rd embodiment of the present disclosure.
Figure 6:
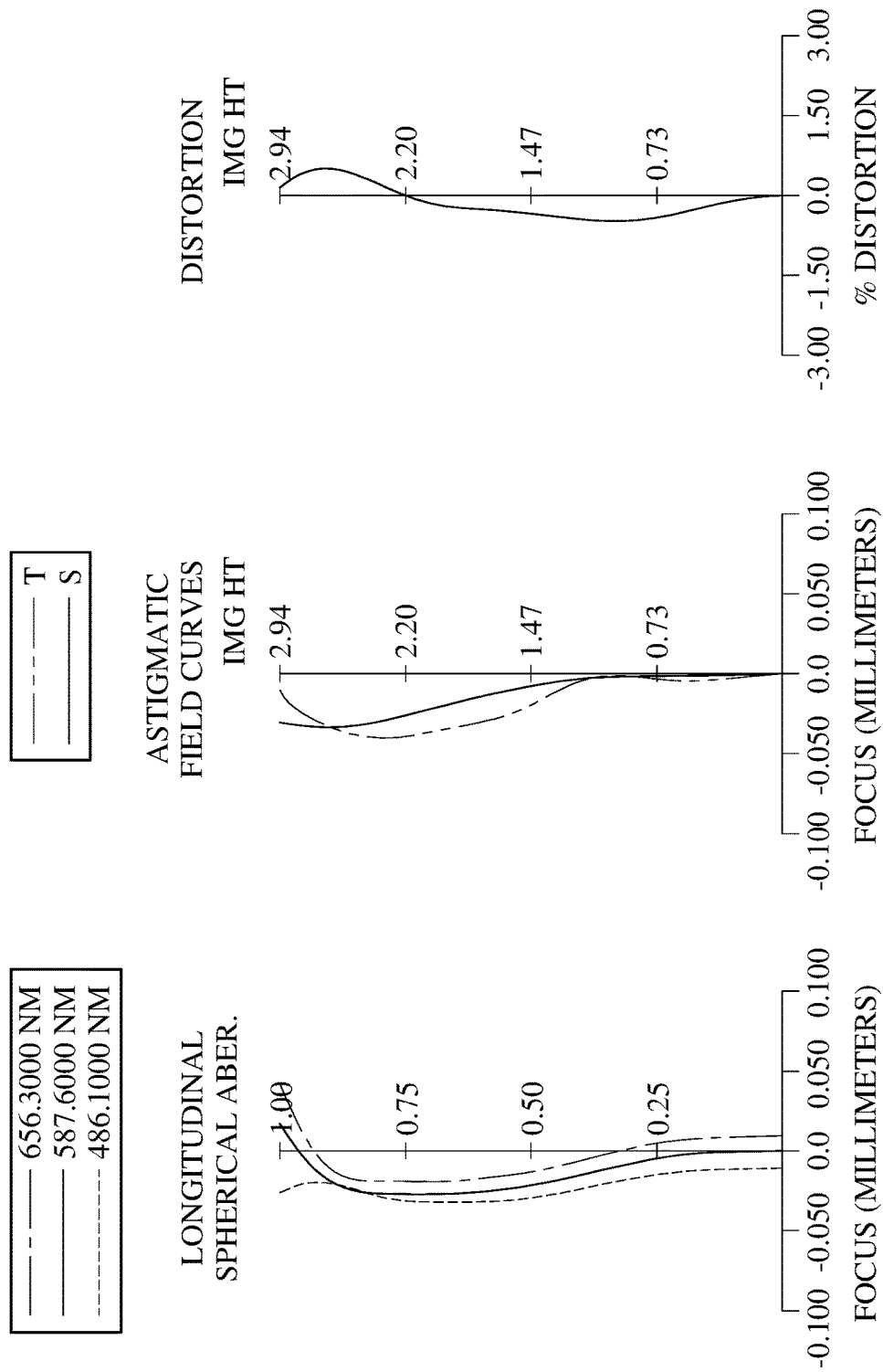
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 380. The imaging optical lens assembly includes, in order from an object side to an image side, an aperture stop 300, a first lens element 310, a second lens element 320, a third lens element 330, a fourth lens element 340, a fifth lens element 350, an IR-cut filter 360 and an image surface 370, wherein the imaging optical lens assembly has a total of five lens elements (310-350). There is an air gap in a paraxial region between every two of the first lens element 310, the second lens element 320, the third lens element 330, the fourth lens element 340 and the fifth lens element 350 that are adjacent to each other.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one concave shape in an off-axis region thereof. The image-side surface 332 of the third lens element 330 has at least one concave shape in an off-axis region thereof.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. The image-side surface 342 of the fourth lens element 340 has at least one convex shape in an off-axis region thereof.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The IR-cut filter 360 is made of glass material and located between the fifth lens element 350 and the image surface 370, and will not affect the focal length of the imaging optical lens assembly. The image sensor 380 is disposed on or near the image surface 370 of the imaging optical lens assembly.

The detailed optical data of the 3rd embodiment are shown in Table 5 and the aspheric surface data are shown in Table 6 below.

TABLE 5

3rd Embodiment
f = 6.29 mm, Fno = 2.82, HFOV = 25.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.520 | | | | |
| 2 | Lens 1 | 1.424 | (ASP) | 0.788 | Plastic | 1.515 | 56.5 | 2.97 |
| 3 | | 17.073 | (ASP) | 0.353 | | | | |
| 4 | Lens 2 | −5.828 | (ASP) | 0.332 | Plastic | 1.660 | 20.4 | −6.05 |
| 5 | | 12.961 | (ASP) | 0.154 | | | | |
| 6 | Lens 3 | 91.911 | (ASP) | 0.320 | Plastic | 1.660 | 20.4 | −29.18 |
| 7 | | 15.898 | (ASP) | 1.383 | | | | |
| 8 | Lens 4 | −3.569 | (ASP) | 0.320 | Plastic | 1.544 | 56.0 | −4.20 |
| 9 | | 6.564 | (ASP) | 0.256 | | | | |
| 10 | Lens 5 | 9.179 | (ASP) | 0.864 | Plastic | 1.660 | 20.4 | 14.37 |
| 11 | | 278.022 | (ASP) | 0.300 | | | | |
| 12 | IR-cut filter | Plano | | 0.210 | Glass | 1.517 | 64.2 | — |
| 13 | | Plano | | 0.311 | | | | |
| 14 | Image | Plano | | — | | | | |

Note:
Reference wavelength is 587.6 nm (d-line).
An effective radius of the image-side surface of the second lens element (Surface 5) is 0.880 mm.
An effective radius of the image-side surface of the third lens element (Surface 7) is 0.850 mm.

TABLE 6

Aspheric Coefficients

| Surface # | 2 | 3 | 4 | 5 | 6 |
|---|---|---|---|---|---|
| k = | −1.2954E+00 | −4.1469E+01 | −8.9586E+01 | −8.9917E+01 | −8.8785E+01 |
| A4 = | 5.6089E−02 | 3.9438E−02 | 4.7487E−02 | 3.3128E−02 | −5.7531E−02 |
| A6 = | 1.0947E−02 | −3.7807E−02 | −2.3035E−01 | −4.1654E−01 | −7.0974E−02 |
| A8 = | −6.0035E−03 | 3.1934E−02 | 5.0795E−01 | 3.4254E−01 | −1.1177E+00 |
| A10 = | 1.2929E−02 | −2.9931E−02 | −7.5015E−01 | 2.5441E−01 | 3.3170E+00 |
| A12 = | −5.9628E−03 | 1.1395E−02 | 6.7826E−01 | −5.2822E−01 | −3.7772E+00 |
| A14 = | — | — | −2.6174E−01 | 1.6893E−01 | 1.4099E+00 |

| Surface # | 7 | 8 | 9 | 10 | 11 |
|---|---|---|---|---|---|
| k = | −1.0004E+00 | −2.8039E+01 | −8.9107E+01 | −1.0193E+00 | −8.7813E+01 |
| A4 = | 8.3186E−02 | −4.6352E−02 | 4.0723E−02 | −4.5265E−02 | −6.5168E−02 |
| A6 = | 3.6283E−02 | −1.9884E−02 | −5.7746E−02 | 4.2475E−02 | 2.7245E−02 |
| A8 = | −2.9200E−01 | 2.9701E−02 | 2.9319E−02 | −2.6964E−02 | −7.7641E−03 |
| A10 = | 8.3032E−01 | −1.1160E−02 | −9.1666E−03 | 8.0071E−03 | 6.5382E−04 |
| A12 = | −8.4880E−01 | 2.0909E−03 | 1.7828E−03 | −1.2194E−03 | 7.6614E−05 |
| A14 = | 2.8860E−01 | −2.0278E−04 | −1.9521E−04 | 9.5710E−05 | −1.3232E−05 |
| A16 = | — | 8.0030E−06 | 8.9677E−06 | −3.2661E−06 | 4.4645E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.29 | TL/f | 0.89 |
| Fno | 2.82 | ImgH/f | 0.47 |
| HFOV [deg.] | 25.1 | (R3 + R4)/(R3 − R4) | −0.38 |
| (V2 + V3 + V5)/(V1 + V4) | 0.54 | R7/R8 | −0.54 |
| V4/V5 | 2.75 | f/|R10| | 0.02 |
| T23/T12 | 0.44 | (f/f2) + (f/f3) + (f/f4) | −2.75 |
| T34/(T12 + T23 + T45) | 1.81 | f/f3 | −0.22 |
| T34/BL | 1.69 | f4/f2 | 0.69 |

4th Embodiment

Figure 7:
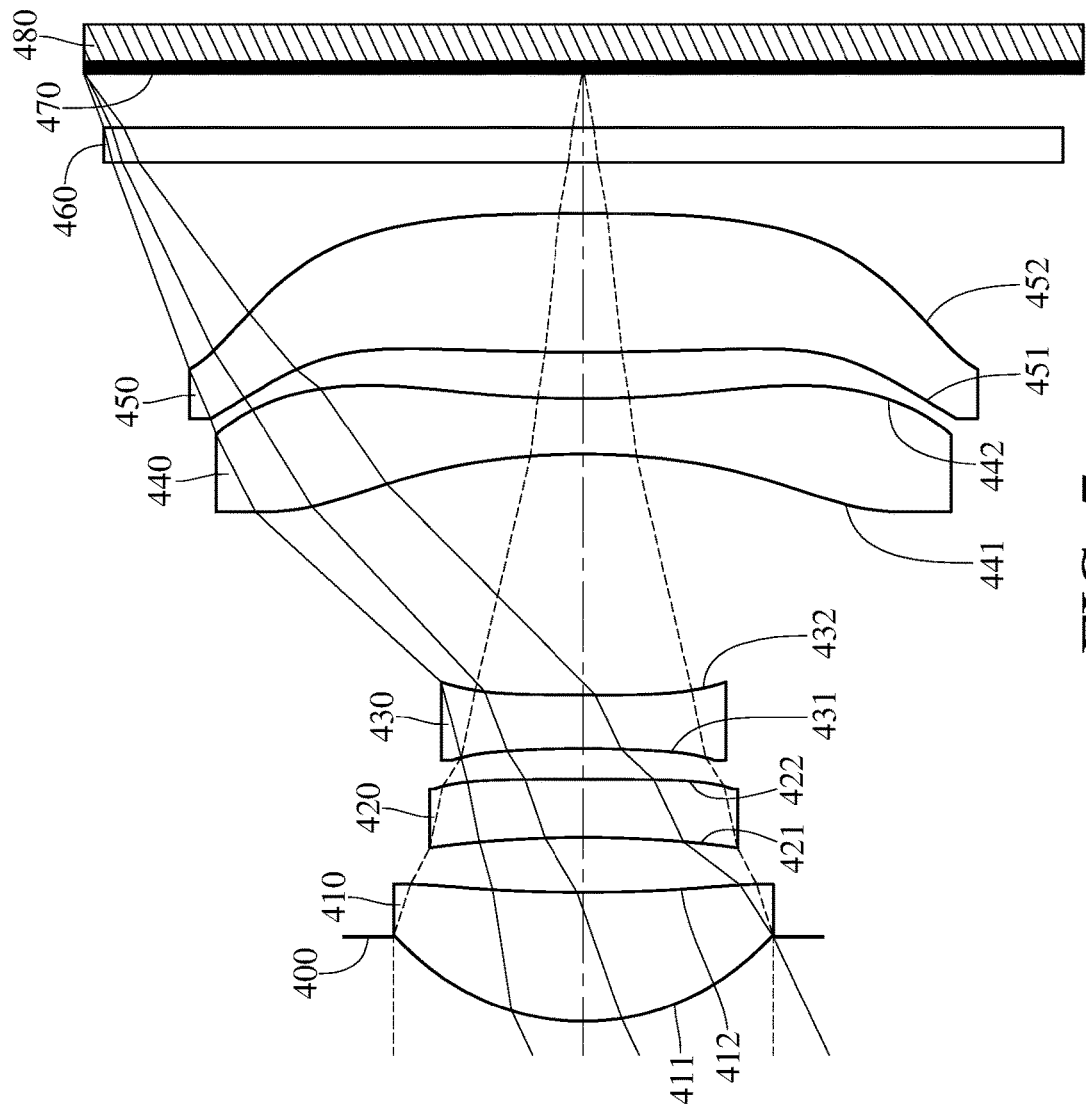
FIG. 7 is a schematic view of an image capturing unit according to the 4th embodiment of the present disclosure.
Figure 8:
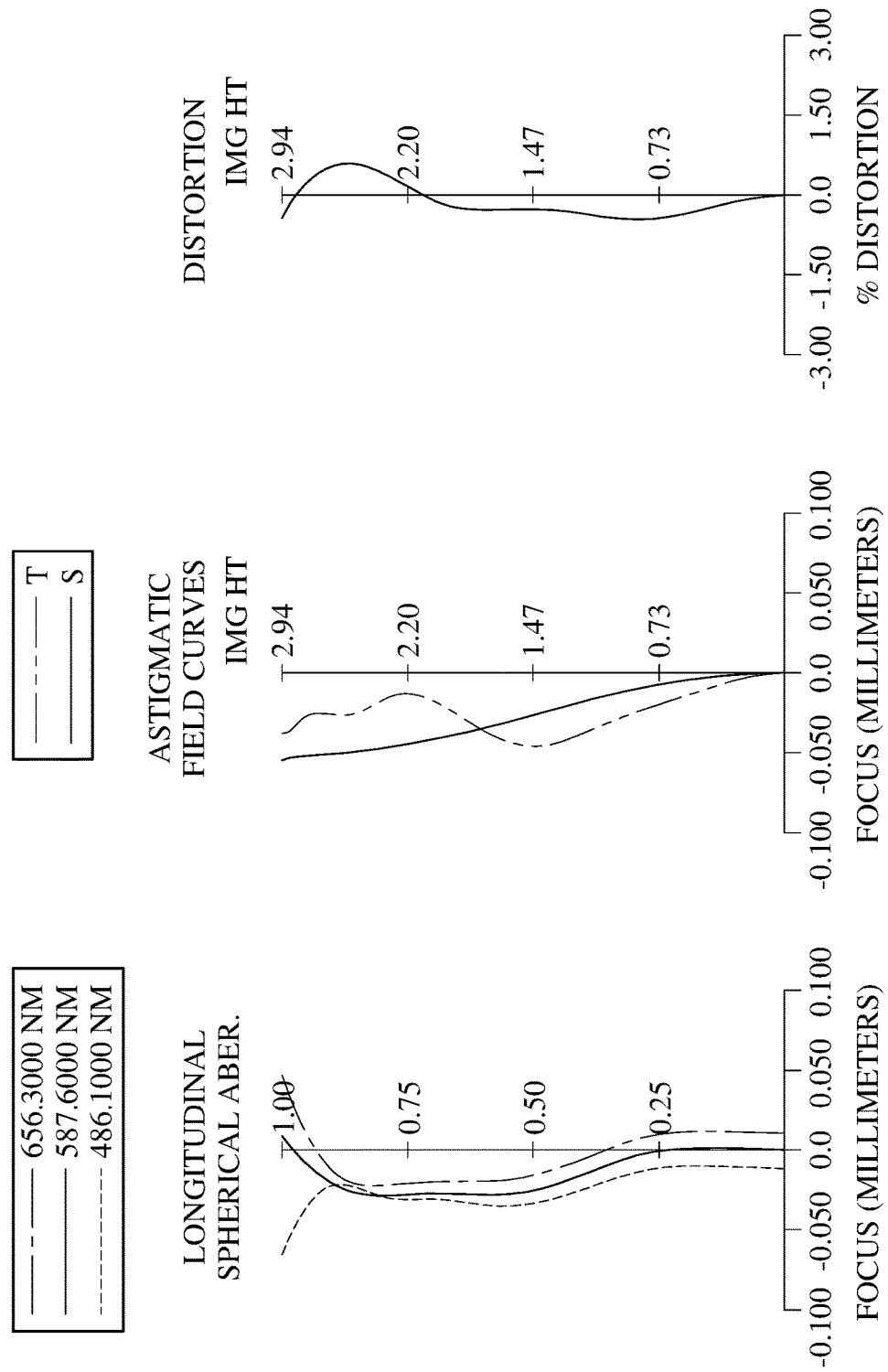
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 480. The imaging optical lens assembly includes, in order from an object side to an image side, an aperture stop 400, a first lens element 410, a second lens element 420, a third lens element 430, a fourth lens element 440, a fifth lens element 450, an IR-cut filter 460 and an image surface 470, wherein the imaging optical lens assembly has a total of five lens elements (410-450). There is an air gap in a paraxial region between every two of the first lens element 410, the second lens element 420, the third lens element 430, the fourth lens element 440 and the fifth lens element 450 that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one concave shape in an off-axis region thereof. The image-side surface 432 of the third lens element 430 has at least one concave shape in an off-axis region thereof.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has at least one convex shape in an off-axis region thereof.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric.

The IR-cut filter 460 is made of glass material and located between the fifth lens element 450 and the image surface 470, and will not affect the focal length of the imaging optical lens assembly. The image sensor 480 is disposed on or near the image surface 470 of the imaging optical lens assembly.

The detailed optical data of the 4th embodiment are shown in Table 7 and the aspheric surface data are shown in Table 8 below.

TABLE 7

4th Embodiment
f = 6.31 mm, Fno = 2.82, HFOV = 25.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.500 | | | | |
| 2 | Lens 1 | 1.457 | (ASP) | 0.764 | Plastic | 1.544 | 56.0 | 2.97 |
| 3 | | 12.080 | (ASP) | 0.323 | | | | |
| 4 | Lens 2 | −5.548 | (ASP) | 0.342 | Plastic | 1.660 | 20.4 | −11.94 |
| 5 | | −19.196 | (ASP) | 0.181 | | | | |
| 6 | Lens 3 | −5.796 | (ASP) | 0.320 | Plastic | 1.660 | 20.4 | −8.47 |
| 7 | | 160.862 | (ASP) | 1.420 | | | | |
| 8 | Lens 4 | −3.796 | (ASP) | 0.330 | Plastic | 1.544 | 56.0 | −4.54 |
| 9 | | 7.266 | (ASP) | 0.273 | | | | |
| 10 | Lens 5 | 13.503 | (ASP) | 0.817 | Plastic | 1.660 | 20.4 | 14.80 |
| 11 | | −34.443 | (ASP) | 0.300 | | | | |
| 12 | IR-cut filter | Plano | | 0.210 | Glass | 1.517 | 64.2 | — |
| 13 | | Plano | | 0.317 | | | | |
| 14 | Image | Plano | | — | | | | |

Note:
Reference wavelength is 587.6 nm (d-line).
An effective radius of the image-side surface of the second lens element (Surface 5) is 0.880 mm.
An effective radius of the image-side surface of the third lens element (Surface 7) is 0.840 mm.

TABLE 8

Aspheric Coefficients

| Surface # | 2 | 3 | 4 | 5 | 6 |
|---|---|---|---|---|---|
| k = | −1.3082E+00 | −4.1469E+01 | −8.9388E+01 | −8.9916E+01 | −8.8473E+01 |
| A4 = | 5.1169E−02 | 4.5971E−02 | 5.8127E−02 | 1.2807E−01 | 8.5893E−02 |
| A6 = | 2.3679E−02 | −5.9938E−02 | −2.2682E−01 | −5.0291E−01 | −3.8081E−01 |
| A8 = | −3.3515E−02 | 5.6887E−02 | 3.6281E−01 | 5.2973E−01 | 1.2617E−01 |
| A10 = | 3.8104E−02 | −5.8829E−02 | −4.9663E−01 | −3.5753E−01 | 4.3029E−01 |
| A12 = | −1.6171E−02 | 2.2436E−02 | 4.5413E−01 | 2.0641E−01 | −8.3436E−01 |
| A14 = | — | — | −1.7317E−01 | −9.6000E−02 | 3.7764E−01 |

| Surface # | 7 | 8 | 9 | 10 | 11 |
|---|---|---|---|---|---|
| k = | −1.0000E+00 | −2.4268E+01 | −8.9110E+01 | −1.0000E+00 | −8.7813E+01 |
| A4 = | 1.7623E−01 | −1.9803E−02 | 5.8357E−02 | −3.2357E−02 | −6.9236E−02 |
| A6 = | −4.9364E−02 | −2.8700E−02 | −7.3350E−02 | 3.5309E−02 | 4.0441E−02 |
| A8 = | −7.8056E−02 | 2.5751E−02 | 3.7245E−02 | −2.7997E−02 | −1.8995E−02 |
| A10 = | 2.7341E−01 | −8.3224E−03 | −1.1808E−02 | 8.9661E−03 | 4.5302E−03 |
| A12 = | −2.5243E−01 | 1.4313E−03 | 2.2929E−03 | −1.4005E−03 | −6.2819E−04 |

TABLE 8-continued

| Aspheric Coefficients | | | | | |
|---|---|---|---|---|---|
| A14 = | 6.8824E−02 | −1.3235E−04 | −2.4566E−04 | 1.0984E−04 | 5.5255E−05 |
| A16 = | — | 5.1319E−06 | 1.0860E−05 | −3.6485E−06 | −2.3065E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.31 | TL/f | 0.89 |
| Fno | 2.82 | ImgH/f | 0.46 |
| HFOV [deg.] | 25.1 | (R3 + R4)/(R3 − R4) | −1.81 |
| (V2 + V3 + V5)/(V1 + V4) | 0.55 | R7/R8 | −0.52 |
| V4/V5 | 2.75 | f/|R10| | 0.18 |
| T23/T12 | 0.56 | (f/f2) + (f/f3) + (f/f4) | −2.66 |
| T34/(T12 + T23 + T45) | 1.83 | f/f3 | −0.74 |
| T34/BL | 1.72 | f4/f2 | 0.38 |

5th Embodiment

Figure 9:
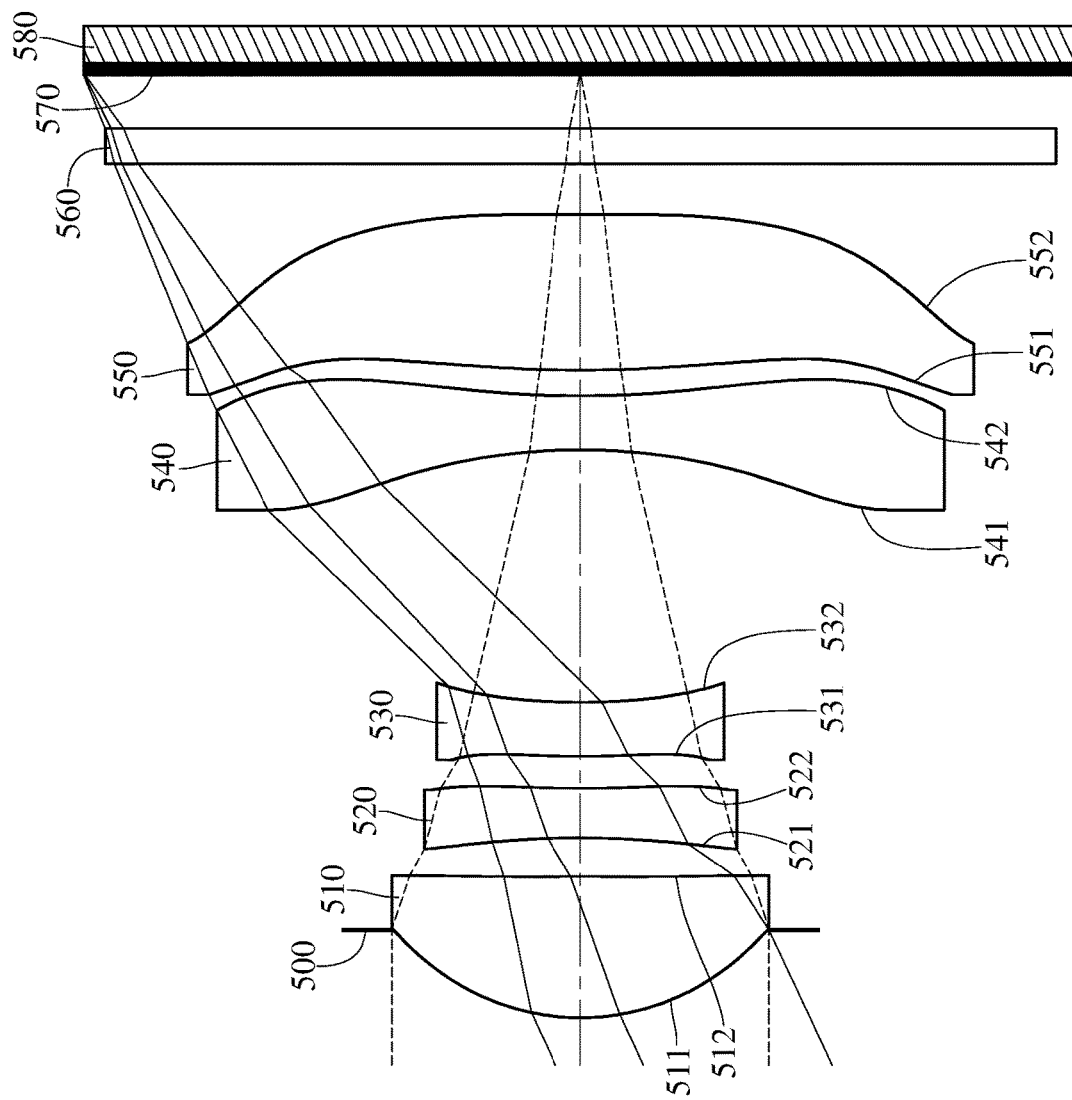
FIG. 9 is a schematic view of an image capturing unit according to the 5th embodiment of the present disclosure.
Figure 10:
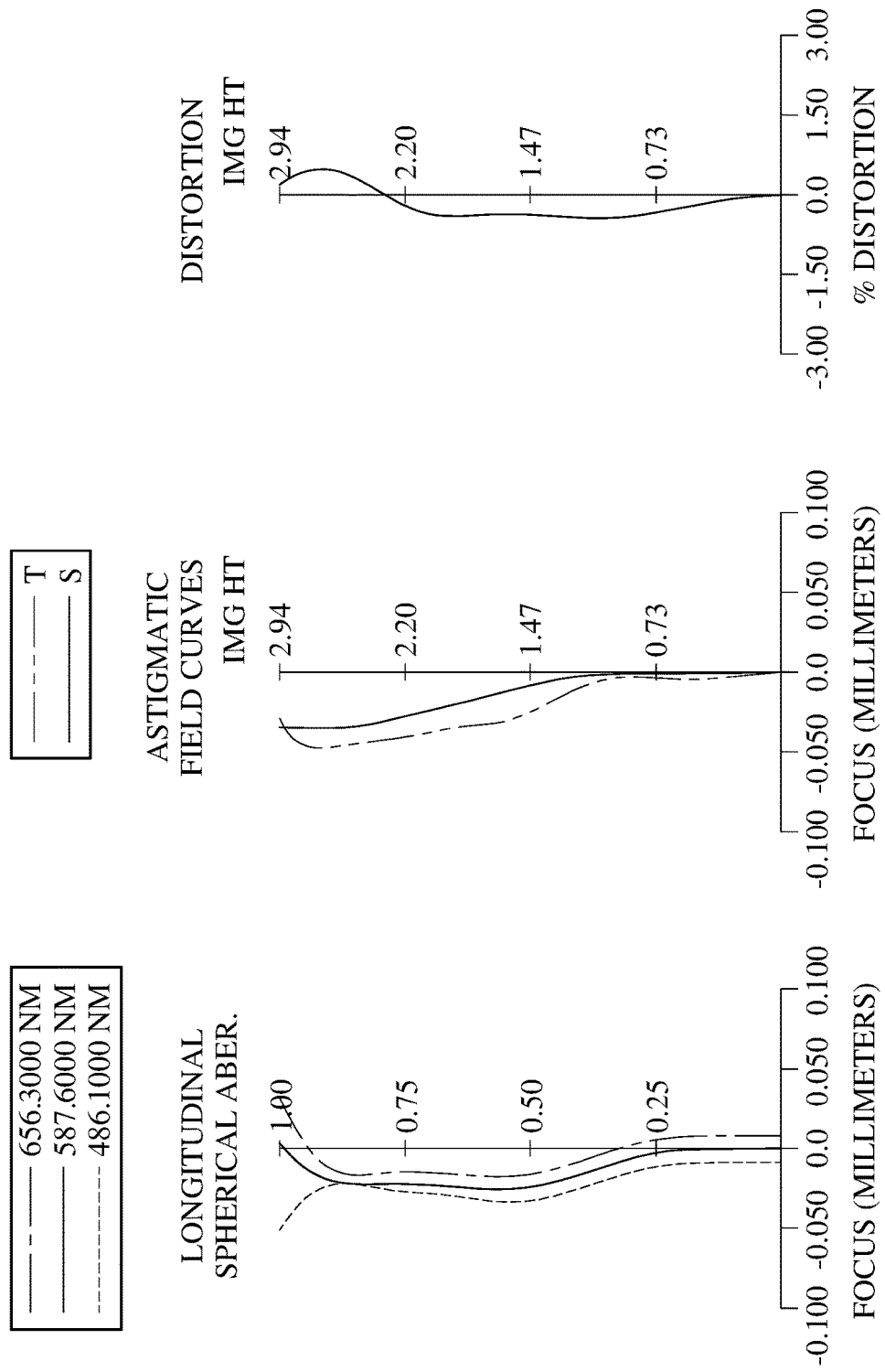
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 580. The imaging optical lens assembly includes, in order from an object side to an image side, an aperture stop 500, a first lens element 510, a second lens element 520, a third lens element 530, a fourth lens element 540, a fifth lens element 550, an IR-cut filter 560 and an image surface 570, wherein the imaging optical lens assembly has a total of five lens elements (510-550). There is an air gap in a paraxial region between every two of the first lens element 510, the second lens element 520, the third lens element 530, the fourth lens element 540 and the fifth lens element 550 that are adjacent to each other.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has at least one concave shape in an off-axis region thereof. The image-side surface 532 of the third lens element 530 has at least one concave shape in an off-axis region thereof.

The fourth lens element 540 with negative refractive power has an object-side surface 541 being concave in a paraxial region thereof and an image-side surface 542 being concave in a paraxial region thereof. The fourth lens element 540 is made of plastic material and has the object-side surface 541 and the image-side surface 542 being both aspheric. The image-side surface 542 of the fourth lens element 540 has at least one convex shape in an off-axis region thereof.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The IR-cut filter 560 is made of glass material and located between the fifth lens element 550 and the image surface 570, and will not affect the focal length of the imaging optical lens assembly. The image sensor 580 is disposed on or near the image surface 570 of the imaging optical lens assembly.

The detailed optical data of the 5th embodiment are shown in Table 9 and the aspheric surface data are shown in Table 10 below.

TABLE 9

5th Embodiment
f = 6.29 mm, Fno = 2.82, HFOV = 25.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.520 | | | | |
| 2 | Lens 1 | 1.410 | (ASP) | 0.836 | Plastic | 1.515 | 56.5 | 2.68 |
| 3 | | −52.230 | (ASP) | 0.232 | | | | |
| 4 | Lens 2 | −4.390 | (ASP) | 0.294 | Plastic | 1.639 | 23.5 | −4.44 |
| 5 | | 8.233 | (ASP) | 0.189 | | | | |
| 6 | Lens 3 | 5.937 | (ASP) | 0.320 | Plastic | 1.639 | 23.5 | −26.16 |
| 7 | | 4.288 | (ASP) | 1.497 | | | | |

TABLE 9-continued

5th Embodiment
f = 6.29 mm, Fno = 2.82, HFOV = 25.1 deg.

| Surface # | | Curvature Radius | | Thickness | Material | Index | Abbe # | Focal Length |
|---|---|---|---|---|---|---|---|---|
| 8 | Lens 4 | −3.471 | (ASP) | 0.320 | Plastic | 1.544 | 56.0 | −4.00 |
| 9 | | 6.040 | (ASP) | 0.151 | | | | |
| 10 | Lens 5 | 6.246 | (ASP) | 0.925 | Plastic | 1.639 | 23.5 | 10.03 |
| 11 | | 239.051 | (ASP) | 0.300 | | | | |
| 12 | IR-cut filter | Plano | | 0.210 | Glass | 1.517 | 64.2 | — |
| 13 | | Plano | | 0.316 | | | | |
| 14 | Image | Plano | | — | | | | |

Note:
Reference wavelength is 587.6 nm (d-line).
An effective radius of the image-side surface of the second lens element (Surface 5) is 0.880 mm.
An effective radius of the image-side surface of the third lens element (Surface 7) is 0.850 mm.
An effective radius of the object-side surface of the fourth lens element (Surface 8) is 1.850 mm.

TABLE 10

Aspheric Coefficients

| Surface # | 2 | 3 | 4 | 5 | 6 |
|---|---|---|---|---|---|
| k = | −1.3073E+00 | −4.1469E+01 | −8.9586E+01 | −8.9917E+01 | −8.8785E+01 |
| A4 = | 5.8181E−02 | 7.1849E−02 | 3.1579E−02 | 5.5627E−02 | −4.3733E−02 |
| A6 = | 1.5749E−02 | −1.2563E−01 | −2.5900E−01 | −5.9135E−01 | −2.0587E−01 |
| A8 = | −2.2002E−02 | 1.4774E−01 | 5.9136E−01 | 1.0812E+00 | −7.0561E−01 |
| A10 = | 3.1914E−02 | −1.2165E−01 | −7.4219E−01 | −1.0069E+00 | 2.6084E+00 |
| A12 = | −1.5084E−02 | 4.2911E−02 | 5.4171E−01 | 5.0507E−01 | −3.2450E+00 |
| A14 = | — | — | −1.6756E−01 | −1.5249E−01 | 1.2714E+00 |

| Surface # | 7 | 8 | 9 | 10 | 11 |
|---|---|---|---|---|---|
| k = | −1.0004E+00 | −2.8039E+01 | −8.9107E+01 | −1.0193E+00 | −8.7813E+01 |
| A4 = | 6.9505E−02 | −5.1570E−02 | 4.0472E−02 | −5.3868E−02 | −5.8748E−02 |
| A6 = | −2.5666E−02 | 1.0335E−02 | −4.0767E−02 | 4.6222E−02 | 1.4231E−02 |
| A8 = | −2.0565E−01 | 1.5471E−04 | 1.6932E−02 | −2.6356E−02 | 1.6336E−03 |
| A10 = | 6.9643E−01 | 1.5352E−03 | −4.7526E−03 | 6.9186E−03 | −2.8505E−03 |
| A12 = | −7.2301E−01 | −7.3319E−04 | 8.5464E−04 | −8.8172E−04 | 7.5282E−04 |
| A14 = | 2.4963E−01 | 1.1659E−04 | −8.6140E−05 | 5.2346E−05 | −7.6213E−05 |
| A16 = | — | −6.4457E−06 | 3.6181E−06 | −1.1464E−06 | 2.6731E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 6.29 | TL/f | 0.89 |
|---|---|---|---|
| Fno | 2.82 | ImgH/f | 0.47 |
| HFOV [deg.] | 25.1 | (R3 + R4)/(R3 − R4) | −0.30 |
| (V2 + V3 + V5)/(V1 + V4) | 0.63 | R7/R8 | −0.57 |
| V4/V5 | 2.38 | f/|R10| | 0.03 |
| T23/T12 | 0.81 | (f/f2) + (f/f3) + (f/f4) | −3.23 |
| T34/(T12 + T23 + T45) | 2.62 | f/f3 | −0.24 |
| T34/BL | 1.81 | f4/f2 | 0.90 |

6th Embodiment

Figure 11:
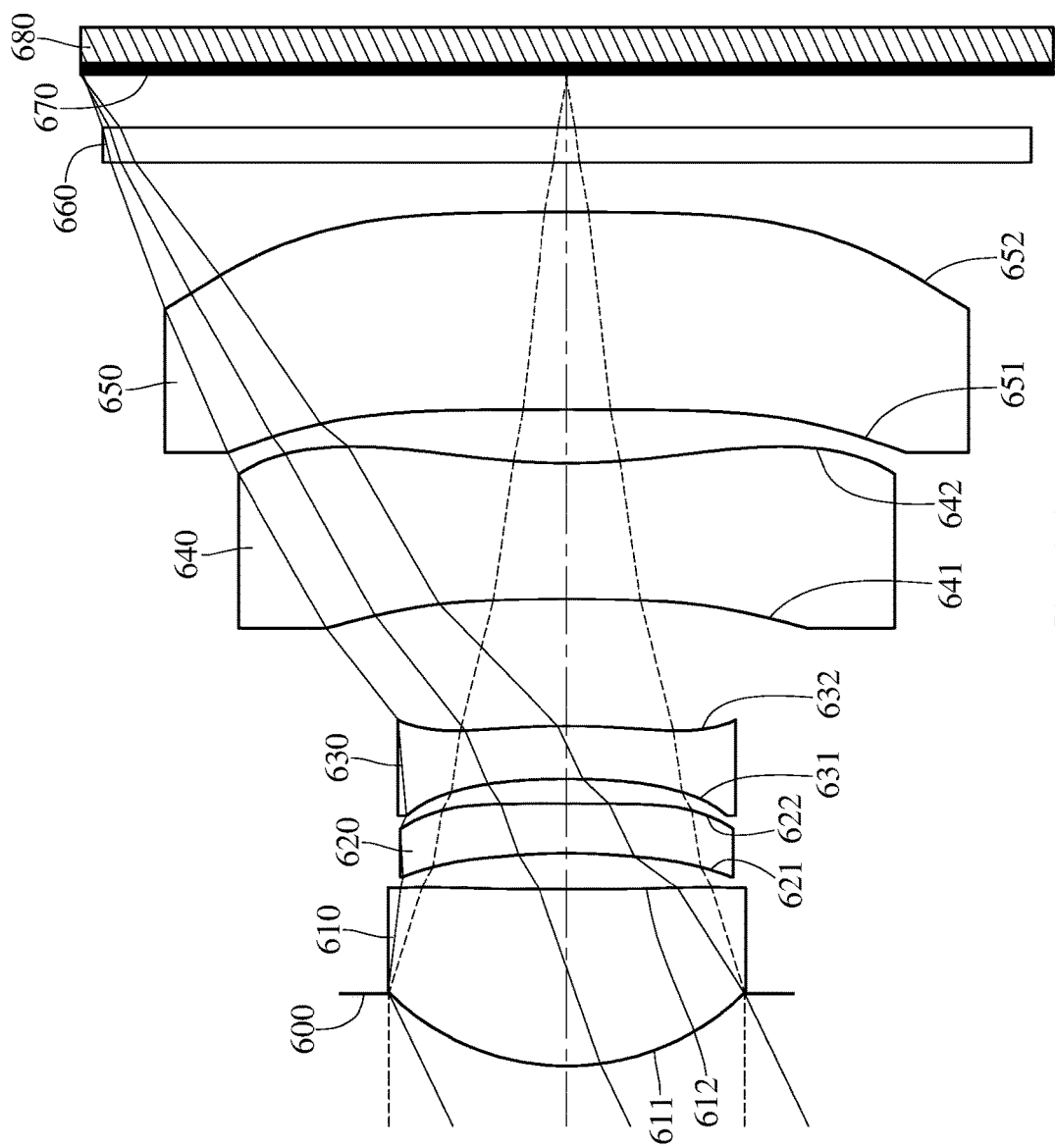
FIG. 11 is a schematic view of an image capturing unit according to the 6th embodiment of the present disclosure.
Figure 12:
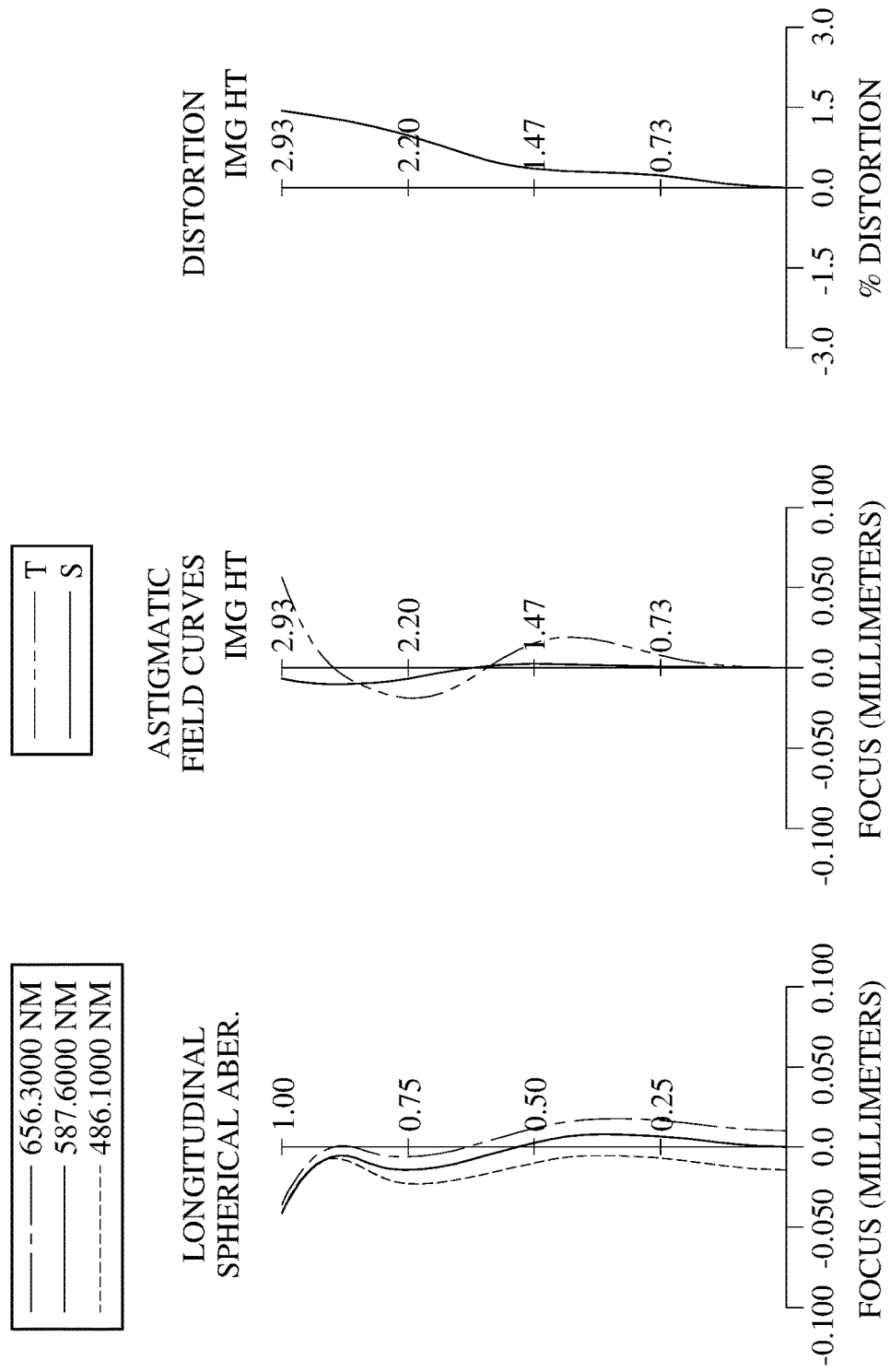
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 680. The imaging optical lens assembly includes, in order from an object side to an image side, an aperture stop 600, a first lens element 610, a second lens element 620, a third lens element 630, a fourth lens element 640, a fifth lens element 650, an IR-cut filter 660 and an image surface 670, wherein the imaging optical lens assembly has a total of five lens elements (610-650). There is an air gap in a paraxial region between every two of the first lens element 610, the second lens element 620, the third lens element 630, the fourth lens element 640 and the fifth lens element 650 that are adjacent to each other.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has at least one concave shape in an off-axis region thereof. The image-side surface 632 of the third lens element 630 has at least one concave shape in an off-axis region thereof.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric. The image-side surface 642 of the fourth lens element 640 has at least one convex shape in an off-axis region thereof.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The IR-cut filter 660 is made of glass material and located between the fifth lens element 650 and the image surface 670, and will not affect the focal length of the imaging optical lens assembly. The image sensor 680 is disposed on or near the image surface 670 of the imaging optical lens assembly.

The detailed optical data of the 6th embodiment are shown in Table 11 and the aspheric surface data are shown in Table 12 below.

TABLE 11

6th Embodiment
f = 6.01 mm, Fno = 2.80, HFOV = 25.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.436 | | | | |
| 2 | Lens 1 | 1.531 | (ASP) | 1.068 | Plastic | 1.530 | 55.8 | 2.95 |
| 3 | | 54.067 | (ASP) | 0.221 | | | | |
| 4 | Lens 2 | −3.887 | (ASP) | 0.300 | Plastic | 1.650 | 21.5 | −6.65 |
| 5 | | −39.267 | (ASP) | 0.148 | | | | |
| 6 | Lens 3 | −4.233 | (ASP) | 0.320 | Plastic | 1.650 | 21.5 | −63.02 |
| 7 | | −4.861 | (ASP) | 0.769 | | | | |
| 8 | Lens 4 | −18.620 | (ASP) | 0.823 | Plastic | 1.544 | 56.0 | −5.99 |
| 9 | | 4.009 | (ASP) | 0.323 | | | | |
| 10 | Lens 5 | −100.000 | (ASP) | 1.198 | Plastic | 1.639 | 23.5 | 170.03 |
| 11 | | −52.301 | (ASP) | 0.300 | | | | |
| 12 | IR-cut filter | Plano | | 0.210 | Glass | 1.517 | 64.2 | — |
| 13 | | Plano | | 0.319 | | | | |
| 14 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −1.4285E+00 | −9.4628E+00 | −2.3684E+01 | −9.0000E+01 | −3.2549E−17 |
| A4 = | 5.0162E−02 | 3.7702E−02 | 5.7703E−02 | 4.5484E−02 | −5.0770E−02 |
| A6 = | 8.5032E−03 | −2.8467E−02 | −2.8271E−01 | −4.3623E−01 | 7.3058E−02 |
| A8 = | −4.6244E−04 | −2.6098E−02 | 4.5691E−01 | 2.0866E−01 | −1.2662E+00 |
| A10 = | 3.8855E−03 | 1.1042E−02 | −6.9522E−01 | 3.8424E−01 | 3.4427E+00 |
| A12 = | −1.3550E−03 | 4.5001E−03 | 6.7615E−01 | −5.2115E−01 | −3.7655E+00 |
| A14 = | — | — | −2.6225E−01 | 1.8081E−01 | 1.4062E+00 |
| A16 = | — | — | — | — | 3.6434E−02 |

| Surface # | 7 | 8 | 9 | 10 | 11 |
|---|---|---|---|---|---|
| k = | −2.2950E+00 | −2.5657E+00 | −2.5399E+01 | −1.3963E+00 | 2.2647E−08 |
| A4 = | 4.7219E−02 | −3.9372E−02 | 1.3920E−02 | −8.3179E−03 | −1.7977E−02 |
| A6 = | 1.2163E−01 | −3.8446E−02 | −4.5974E−02 | −4.6740E−03 | −6.0815E−03 |
| A8 = | −3.7933E−01 | 6.1743E−02 | 2.8379E−02 | −1.6234E−03 | 3.8442E−03 |
| A10 = | 1.1938E+00 | −3.1998E−02 | −9.5644E−03 | 2.2962E−03 | −9.6053E−04 |
| A12 = | −1.4998E+00 | 6.3736E−03 | 1.8122E−03 | −8.1429E−04 | 1.1465E−04 |
| A14 = | 7.5271E−01 | 6.6901E−05 | −1.8641E−04 | 1.3018E−04 | −5.3314E−06 |
| A16 = | −1.0623E−01 | −1.1614E−04 | 8.0409E−06 | −7.9548E−06 | 3.0672E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.01 | TL/f | 1.00 |
| Fno | 2.80 | ImgH/f | 0.49 |
| HFOV [deg.] | 25.7 | (R3 + R4)/(R3 − R4) | −1.22 |
| (V2 + V3 + V5)/(V1 + V4) | 0.59 | R7/R8 | −4.64 |
| V4/V5 | 2.38 | f/|R10| | 0.11 |
| T23/T12 | 0.67 | (f/f2) + (f/f3) + (f/f4) | −2.00 |
| T34/(T12 + T23 + T45) | 1.11 | f/f3 | −0.10 |
| T34/BL | 0.93 | f4/f2 | 0.90 |

7th Embodiment

Figure 13:
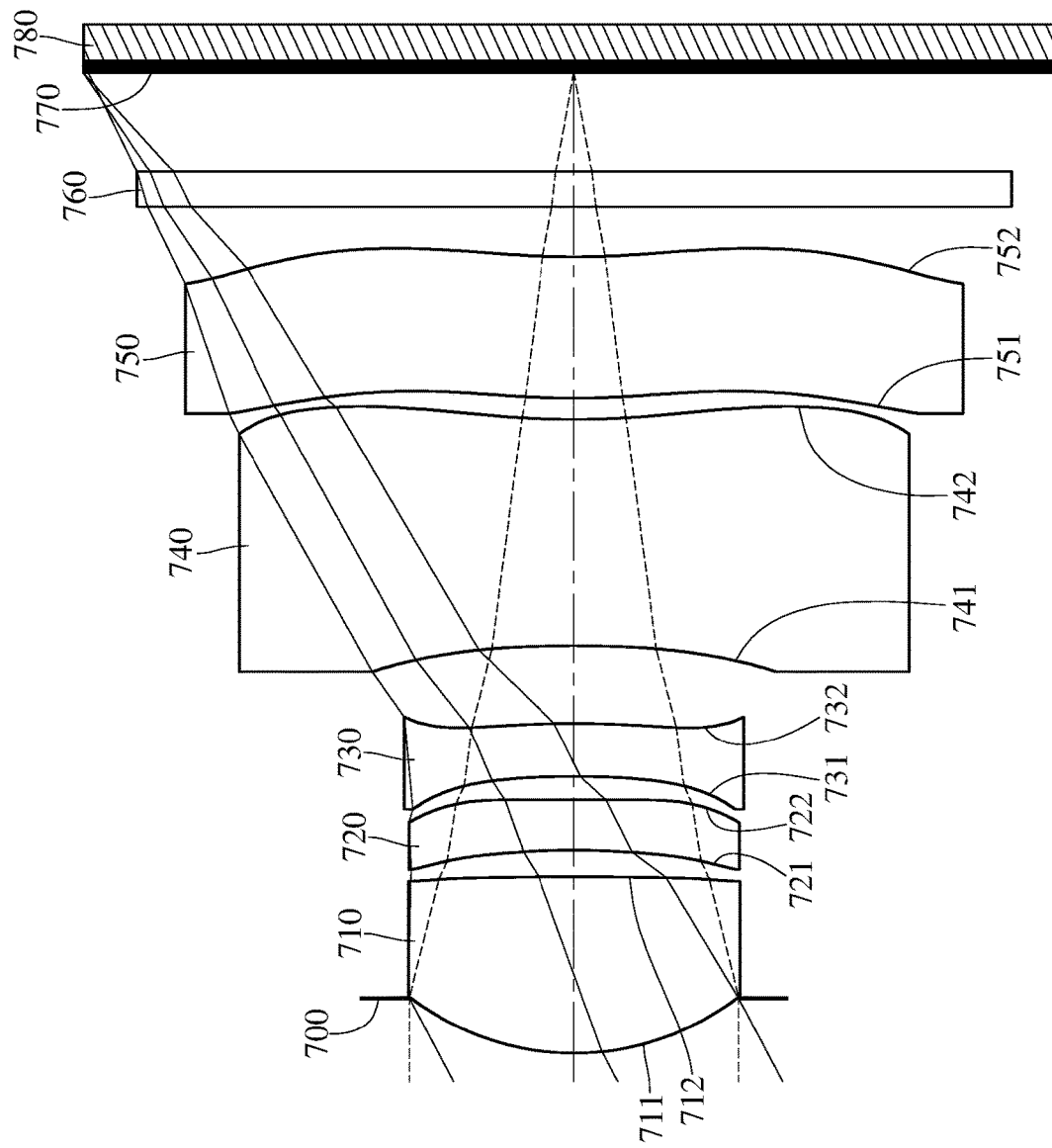
FIG. 13 a schematic view of an image capturing unit according to the 7th embodiment of the present disclosure.
Figure 14:
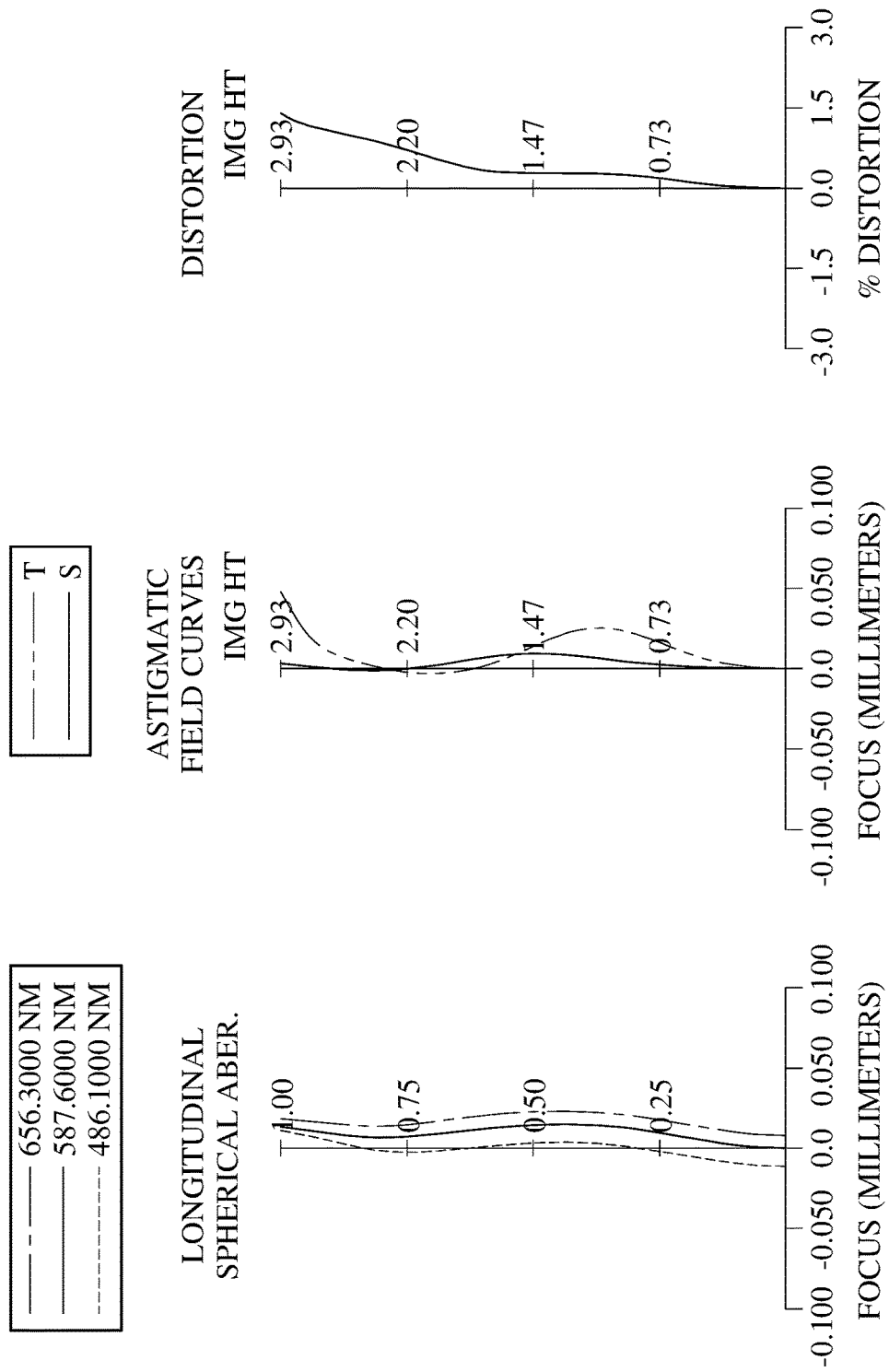
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 780. The imaging optical lens assembly includes, in order from an object side to an image side, an aperture stop 700, a first lens element 710, a second lens element 720, a third lens element 730, a fourth lens element 740, a fifth lens element 750, an IR-cut filter 760 and an image surface 770, wherein the imaging optical lens assembly has a total of five lens elements (710-750). There is an air gap in a paraxial region between every two of the first lens element 710, the second lens element 720, the third lens element 730, the fourth lens element 740 and the fifth lens element 750 that are adjacent to each other.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. The object-side surface 731 of the third lens element 730 has at least one concave shape in an off-axis region thereof. The image-side surface 732 of the third lens element 730 has at least one concave shape in an off-axis region thereof.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one convex shape in an off-axis region thereof.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The IR-cut filter 760 is made of glass material and located between the fifth lens element 750 and the image surface 770, and will not affect the focal length of the imaging optical lens assembly. The image sensor 780 is disposed on or near the image surface 770 of the imaging optical lens assembly.

The detailed optical data of the 7th embodiment are shown in Table 13 and the aspheric surface data are shown in Table 14 below.

TABLE 13

7th Embodiment
f = 5.51 mm, Fno = 2.80, HFOV = 27.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.331 | | | | |
| 2 | Lens 1 | 1.589 | (ASP) | 1.058 | Plastic | 1.530 | 55.8 | 2.80 |
| 3 | | −16.975 | (ASP) | 0.159 | | | | |
| 4 | Lens 2 | −4.094 | (ASP) | 0.300 | Plastic | 1.650 | 21.5 | −6.09 |
| 5 | | 124.255 | (ASP) | 0.140 | | | | |
| 6 | Lens 3 | −6.082 | (ASP) | 0.320 | Plastic | 1.650 | 21.5 | 314.00 |
| 7 | | −6.028 | (ASP) | 0.464 | | | | |
| 8 | Lens 4 | −7.503 | (ASP) | 1.358 | Plastic | 1.544 | 56.0 | −5.32 |
| 9 | | 5.007 | (ASP) | 0.126 | | | | |
| 10 | Lens 5 | 4.990 | (ASP) | 0.844 | Plastic | 1.639 | 23.5 | 157.21 |
| 11 | | 4.905 | (ASP) | 0.300 | | | | |
| 12 | IR-cut filter | Plano | | 0.210 | Glass | 1.517 | 64.2 | — |
| 13 | | Plano | | 0.593 | | | | |
| 14 | Image | Plano | | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | −1.5768E+00 | −9.0000E+01 | −3.1153E+01 | 1.0000E+01 | −5.9490E−03 |
| A4 = | 4.6815E−02 | 4.9211E−02 | 7.6639E−02 | 4.4098E−02 | −7.8960E−02 |
| A6 = | 1.0628E−02 | −4.9534E−02 | −2.9895E−01 | −4.4876E−01 | 4.5626E−02 |
| A8 = | −1.4105E−02 | −7.2989E−02 | 3.9710E−01 | 1.5900E−01 | −1.2220E+00 |
| A10 = | 1.6501E−02 | 6.7737E−02 | −6.2028E−01 | 4.3976E−01 | 3.4445E+00 |
| A12 = | −7.5722E−03 | 4.5001E−03 | 6.7615E−01 | −5.2115E−01 | −3.7655E+00 |
| A14 = | — | — | −2.6225E−01 | 1.8081E−01 | 1.4062E+00 |
| A16 = | — | — | — | — | 3.6434E−02 |

| Surface # | 7 | 8 | 9 | 10 | 11 |
|---|---|---|---|---|---|
| k = | −2.2950E+00 | −2.5657E+00 | −4.9332E+01 | −1.3963E+00 | −2.2224E−08 |
| A4 = | 1.7914E−02 | −3.1312E−02 | 1.6265E−02 | −5.8969E−02 | −5.5262E−02 |
| A6 = | 1.2165E−01 | 4.9432E−03 | −4.4706E−02 | −1.3382E−02 | 3.1679E−04 |
| A8 = | −4.9961E−01 | −6.7826E−02 | 2.8393E−02 | 2.1793E−02 | 5.6125E−03 |
| A10 = | 1.6483E+00 | 1.4500E−01 | −9.5933E−03 | −8.8066E−03 | −1.9959E−03 |
| A12 = | −2.0566E+00 | −1.1838E−01 | 1.7988E−03 | 1.7182E−03 | 3.1598E−04 |
| A14 = | 1.0427E+00 | 4.2405E−02 | −1.8742E−04 | −1.6231E−04 | −2.2685E−05 |
| A16 = | −1.6147E−01 | −5.5378E−03 | 8.7185E−06 | 5.8545E−06 | 5.6680E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.51 | TL/f | 1.07 |
| Fno | 2.80 | ImgH/f | 0.53 |
| HFOV [deg.] | 27.6 | (R3 + R4)/(R3 − R4) | −0.94 |
| (V2 + V3 + V5)/(V1 + V4) | 0.59 | R7/R8 | −1.50 |
| V4/V5 | 2.38 | f/|R10| | 1.12 |
| T23/T12 | 0.88 | (f/f2) + (f/f3) + (f/f4) | −1.92 |
| T34/(T12 + T23 + T45) | 1.09 | f/f3 | 0.02 |
| T34/BL | 0.42 | f4/f2 | 0.87 |

8th Embodiment

Figure 15:
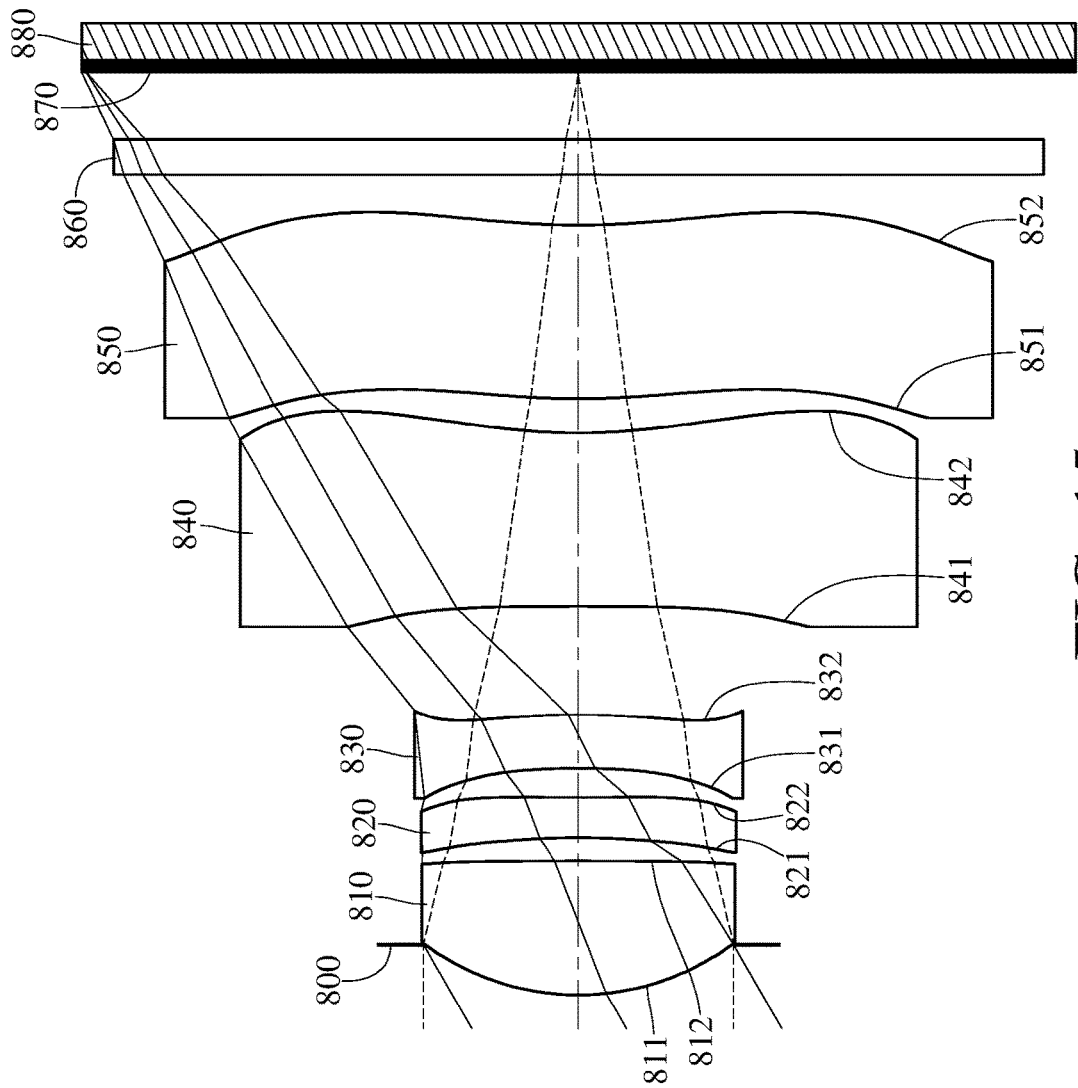
FIG. 15 a schematic view of an image capturing unit according to the 8th embodiment of the present disclosure.
Figure 16:
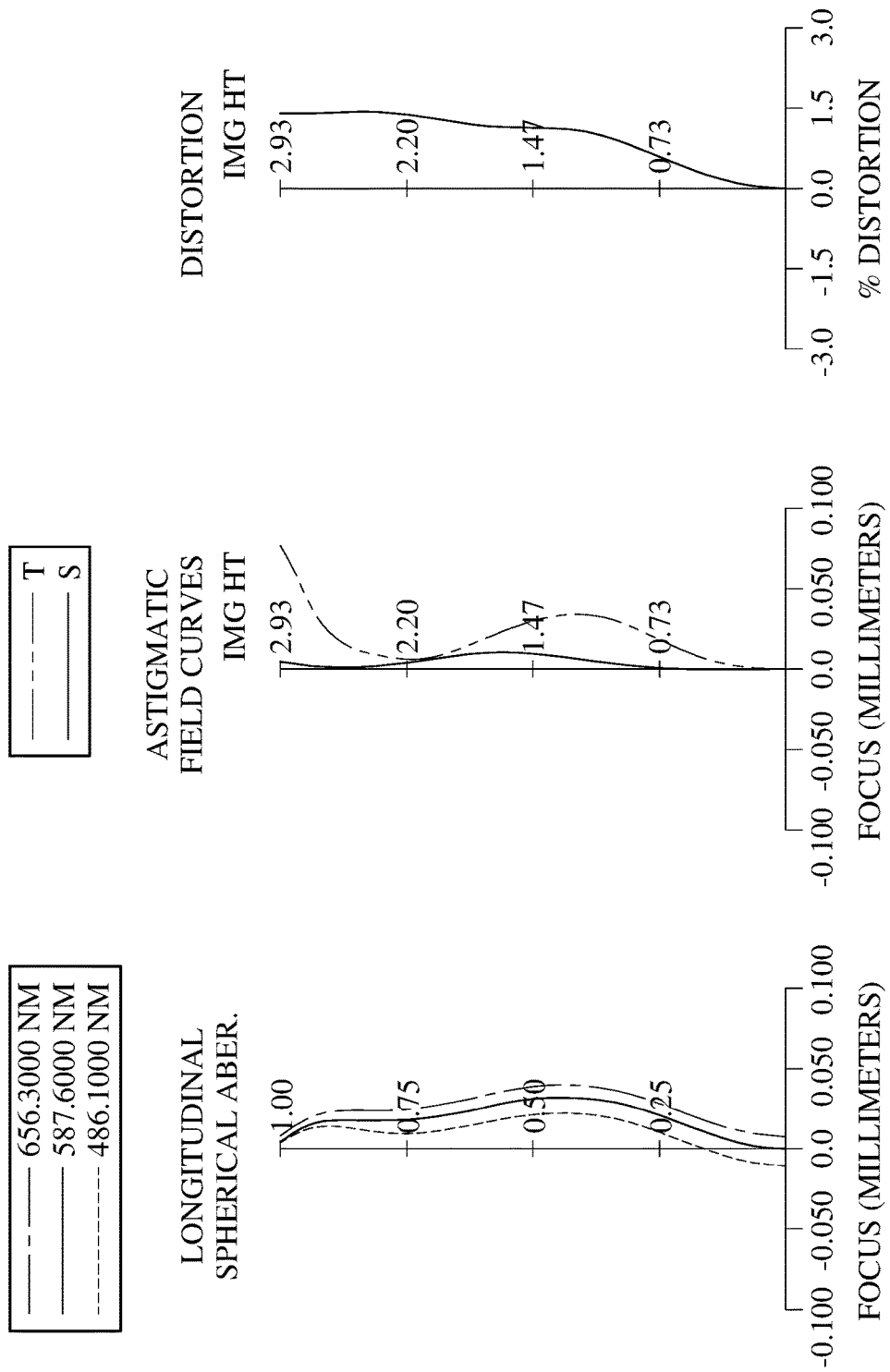
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens assembly (its reference numeral is omitted) of the present disclosure and an image sensor 880. The imaging optical lens assembly includes, in order from an object side to an image side, an aperture stop 800, a first lens element 810, a second lens element 820, a third lens element 830, a fourth lens element 840, a fifth lens element 850, an IR-cut filter 860 and an image surface 870, wherein the imaging optical lens assembly has a total of five lens elements (810-850). There is an air gap in a paraxial region between every two of the first lens element 810, the second lens element 820, the third lens element 830, the fourth lens element 840 and the fifth lens element 850 that are adjacent to each other.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric. The object-side surface 831 of the third lens element 830 has at least one concave shape in an off-axis region thereof. The image-side surface 832 of the third lens element 830 has at least one concave shape in an off-axis region thereof.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one convex shape in an off-axis region thereof.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric.

The IR-cut filter 860 is made of glass material and located between the fifth lens element 850 and the image surface 870, and will not affect the focal length of the imaging optical lens assembly. The image sensor 880 is disposed on or near the image surface 870 of the imaging optical lens assembly.

The detailed optical data of the 8th embodiment are shown in Table 15 and the aspheric surface data are shown in Table 16 below.

TABLE 15

8th Embodiment
f = 5.02 mm, Fno = 2.72, HFOV = 29.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.300 | | | | |
| 2 | Lens 1 | 1.531 | (ASP) | 0.799 | Plastic | 1.544 | 56.0 | 2.67 |
| 3 | | −23.299 | (ASP) | 0.139 | | | | |
| 4 | Lens 2 | −4.118 | (ASP) | 0.240 | Plastic | 1.639 | 23.5 | −6.01 |
| 5 | | 57.216 | (ASP) | 0.173 | | | | |
| 6 | Lens 3 | −4.555 | (ASP) | 0.320 | Plastic | 1.639 | 23.5 | −97.33 |
| 7 | | −5.050 | (ASP) | 0.648 | | | | |
| 8 | Lens 4 | −100.000 | (ASP) | 1.033 | Plastic | 1.514 | 56.8 | −6.52 |
| 9 | | 3.478 | (ASP) | 0.206 | | | | |
| 10 | Lens 5 | 4.742 | (ASP) | 1.034 | Plastic | 1.583 | 30.2 | 89.90 |
| 11 | | 4.794 | (ASP) | 0.300 | | | | |
| 12 | IR-cut filter | Plano | | 0.210 | Glass | 1.517 | 64.2 | — |
| 13 | | Plano | | 0.403 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | −1.5922E+00 | 7.9633E+00 | −3.9316E+01 | −7.7274E+01 | 0.0000E+00 |
| A4 = | 5.0432E−02 | 4.6729E−02 | 7.9589E−02 | 4.6920E−02 | −1.1093E−01 |
| A6 = | 2.6725E−02 | −4.7605E−02 | −2.8671E−01 | −3.9498E−01 | 1.3481E−01 |
| A8 = | −5.0624E−02 | −5.0337E−02 | 4.2219E−01 | 1.1603E−01 | −1.3013E+00 |
| A10 = | 5.9960E−02 | 3.8367E−02 | −6.4266E−01 | 4.6847E−01 | 3.5233E+00 |
| A12 = | −3.0597E−02 | 1.1333E−02 | 6.7787E−01 | −5.2927E−01 | −3.7789E+00 |
| A14 = | — | — | −2.6060E−01 | 1.6656E−01 | 1.4062E+00 |
| A16 = | — | — | — | — | 1.4135E−03 |

| Surface # | 7 | 8 | 9 | 10 | 11 |
|---|---|---|---|---|---|
| k = | 0.0000E+00 | 1.0000E+00 | −2.2251E+01 | −1.4014E+00 | 0.0000E+00 |
| A4 = | 1.9534E−02 | −3.1196E−02 | 1.8761E−02 | −4.7342E−02 | −2.8200E−02 |
| A6 = | 4.4514E−02 | −3.2862E−02 | −4.4040E−02 | −1.2419E−02 | −1.4623E−02 |
| A8 = | −8.2746E−02 | 3.9984E−02 | 2.6969E−02 | 1.5608E−02 | 9.2780E−03 |
| A10 = | 6.6141E−01 | −2.0078E−02 | −9.3748E−03 | −5.8447E−03 | −2.5139E−03 |
| A12 = | −7.9400E−01 | 5.3120E−03 | 1.8064E−03 | 1.0199E−03 | 3.6311E−04 |
| A14 = | 2.8900E−01 | −5.8444E−04 | −1.8625E−04 | −7.4234E−05 | −2.6422E−05 |
| A16 = | −6.5683E−04 | 8.0030E−06 | 8.2384E−06 | 1.1288E−06 | 7.5482E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.02 | TL/f | 1.10 |
| Fno | 2.72 | ImgH/f | 0.58 |
| HFOV [deg.] | 29.8 | (R3 + R4)/(R3 − R4) | −0.87 |
| (V2 + V3 + V5)/(V1 + V4) | 0.68 | R7/R8 | −28.75 |
| V4/V5 | 1.88 | f/|R10| | 1.05 |
| T23/T12 | 1.24 | (f/f2) + (f/f3) + (f/f4) | −1.66 |
| T34/(T12 + T23 + T45) | 1.25 | f/f3 | −0.05 |
| T34/BL | 0.71 | f4/f2 | 1.08 |

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising five lens elements, the five lens elements being, in order from an object side to an image side:
   a first lens element with positive refractive power having an object-side surface being convex in a paraxial region thereof;

a second lens element with negative refractive power having an object-side surface being concave in a paraxial region thereof;

a third lens element having an object-side surface being convex in a paraxial region thereof;

a fourth lens element with negative refractive power having an image-side surface being concave in a paraxial region thereof, wherein the image-side surface of the fourth lens element has at least one convex shape in an off-axis region thereof, and the image-side surface of the fourth lens element is aspheric; and a fifth lens element;

wherein a curvature radius of the object-side surface of the second lens element is R3, a curvature radius of an image-side surface of the second lens element is R4, an Abbe number of the first lens element is V1, an Abbe number of the second lens element is V2, an Abbe number of the third lens element is V3, an Abbe number of the fourth lens element is V4, an Abbe number of the fifth lens element is V5, and the following conditions are satisfied:

$(R3+R4)/(R3-R4)<0.50;$ $1.8<V4/V5<3.5;$ and $0.45<(V2+V3+V5)/(V1+V4)<0.75.$

2. The imaging optical lens assembly of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$1.0<T34/(T12+T23+T45)<4.0.$

3. The imaging optical lens assembly of claim 1, wherein a focal length of the imaging optical lens assembly is f, a curvature radius of an image-side surface of the fifth lens element is R10, and the following condition is satisfied:

$f/|R10|<1.20.$

4. The imaging optical lens assembly of claim 1, wherein the curvature radius of the object-side surface of the second lens element is R3, the curvature radius of the image-side surface of the second lens element is R4, and the following condition is satisfied:

$(R3+R4)/(R3-R4)<0.$

5. The imaging optical lens assembly of claim 1, wherein a maximum image height of the imaging optical lens assembly is ImgH, a focal length of the imaging optical lens assembly is f, and the following condition is satisfied:

$0.25<ImgH/f<0.55.$

6. The imaging optical lens assembly of claim 1, wherein an axial distance between the object-side surface of the first lens element and an image surface is TL, a focal length of the imaging optical lens assembly is f, and the following condition is satisfied:

$0.75<TL/f<1.10.$

7. The imaging optical lens assembly of claim 1, wherein an axial distance between the third lens element and the fourth lens element is T34, an axial distance between an image-side surface of the fifth lens element and an image surface is BL, and the following condition is satisfied:

$1.20<T34/BL<2.5.$

8. The imaging optical lens assembly of claim 1, wherein a focal length of the imaging optical lens assembly is f, a focal length of the second lens element is f2, a focal length of the third lens element is f3, a focal length of the fourth lens element is f4, and the following condition is satisfied:

$-4.0<(f/f2)+(f/f3)+(f/f4)<-2.0.$

9. The imaging optical lens assembly of claim 1, wherein an axial distance between the first lens element and the second lens element is T12, an axial distance between the second lens element and the third lens element is T23, and the following condition is satisfied:

$0<T23/T12<1.75.$

10. The imaging optical lens assembly of claim 1, wherein the fifth lens element has positive refractive power.

11. The imaging optical lens assembly of claim 1, wherein the fifth lens element has an object-side surface being convex in a paraxial region thereof.

12. The imaging optical lens assembly of claim 1, wherein the fifth lens element has an image-side surface being concave in a paraxial region thereof.

13. The imaging optical lens assembly of claim 1, wherein the third lens element has an image-side surface being concave in a paraxial region thereof.

14. An imaging optical lens assembly comprising five lens elements, the five lens elements being, in order from an object side to an image side:

a first lens element with positive refractive power having an object-side surface being convex in a paraxial region thereof;

a second lens element with negative refractive power having an object-side surface being concave in a paraxial region thereof;

a third lens element;

a fourth lens element with negative refractive power having an image-side surface being concave in a paraxial region thereof, wherein the image-side surface of the fourth lens element has at least one convex shape in an off-axis region thereof, and the image-side surface of the fourth lens element is aspheric; and a fifth lens element;

wherein a curvature radius of the object-side surface of the second lens element is R3, a curvature radius of an image-side surface of the second lens element is R4, an Abbe number of the fourth lens element is V4, an Abbe number of the fifth lens element is V5, a maximum image height of the imaging optical lens assembly is ImgH, a focal length of the imaging optical lens assembly is f, and the following conditions are satisfied:

$(R3+R4)/(R3-R4)\leq-0.30;$ $1.8<V4/V5<3.5;$ and $0.25<ImgH/f<0.55.$

15. The imaging optical lens assembly of claim 14, wherein the focal length of the imaging optical lens assembly is f, a curvature radius of an image-side surface of the fifth lens element is R10, and the following condition is satisfied:

$f/|R10|<1.20.$

16. The imaging optical lens assembly of claim 14, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$1.0 < T34/(T12+T23+T45) < 4.0$.

17. The imaging optical lens assembly of claim 14, wherein an axial distance between the first lens element and the second lens element is T12, an axial distance between the second lens element and the third lens element is T23, and the following condition is satisfied:

$0 < T23/T12 < 1.75$.

18. The imaging optical lens assembly of claim 14, wherein the focal length of the imaging optical lens assembly is f, a focal length of the second lens element is f2, a focal length of the third lens element is f3, a focal length of the fourth lens element is f4, and the following condition is satisfied:

$-4.0 < (f/f2)+(f/f3)+(f/f4) < -2.0$.

19. The imaging optical lens assembly of claim 14, wherein an axial distance between the object-side surface of the first lens element and an image surface is TL, the focal length of the imaging optical lens assembly is f, and the following condition is satisfied:

$0.75 < TL/f < 1.10$.

20. The imaging optical lens assembly of claim 14, wherein an axial distance between the third lens element and the fourth lens element is T34, an axial distance between an image-side surface of the fifth lens element and an image surface is BL, and the following condition is satisfied:

$1.20 < T34/BL < 2.5$.

21. An imaging optical lens assembly comprising five lens elements, the five lens elements being, in order from an object side to an image side:
  a first lens element with positive refractive power having an object-side surface being convex in a paraxial region thereof and an image-side surface being concave in a paraxial region thereof;
  a second lens element with negative refractive power having an object-side surface being concave in a paraxial region thereof;
  a third lens element;
  a fourth lens element with negative refractive power having an image-side surface being concave in a paraxial region thereof, wherein the image-side surface of the fourth lens element has at least one convex shape in an off-axis region thereof, and the image-side surface of the fourth lens element is aspheric; and
  a fifth lens element;
wherein a curvature radius of the object-side surface of the second lens element is R3, a curvature radius of an image-side surface of the second lens element is R4, a maximum image height of the imaging optical lens assembly is ImgH, a focal length of the imaging optical lens assembly is f, and the following conditions are satisfied:

$(R3+R4)/(R3-R4) < 0.50$; and $0.25 < ImgH/f < 0.55$.

22. The imaging optical lens assembly of claim 21, wherein an axial distance between the object-side surface of the first lens element and an image surface is TL, the focal length of the imaging optical lens assembly is f, and the following condition is satisfied:

$0.75 < TL/f < 1.10$.

23. The imaging optical lens assembly of claim 21, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$1.0 < T34/(T12+T23+T45) < 4.0$.

24. The imaging optical lens assembly of claim 21, wherein an Abbe number of the fourth lens element is V4, an Abbe number of the fifth lens element is V5, and the following condition is satisfied:

$1.8 < V4/V5 < 3.5$.

25. The imaging optical lens assembly of claim 21, wherein an Abbe number of the first lens element is V1, an Abbe number of the second lens element is V2, an Abbe number of the third lens element is V3, an Abbe number of the fourth lens element is V4, an Abbe number of the fifth lens element is V5, and the following condition is satisfied:

$0.45 < (V2+V3+V5)/(V1+V4) < 0.75$.

26. The imaging optical lens assembly of claim 21, wherein an axial distance between the first lens element and the second lens element is T12, an axial distance between the second lens element and the third lens element is T23, and the following condition is satisfied:

$0 < T23/T12 < 1.75$.

* * * * *